(12) United States Patent
Zhao et al.

(10) Patent No.: US 12,278,561 B2
(45) Date of Patent: Apr. 15, 2025

(54) SWITCHED CAPACITOR VOLTAGE CONVERTER

(71) Applicant: Southchip Semiconductor Technology (Shanghai) Co., Ltd., Shanghai (CN)

(72) Inventors: Wei Zhao, Shanghai (CN); Xing Liang, Shanghai (CN)

(73) Assignee: Southchip Semiconductor Technology (Shanghai) Co., Ltd., Shanghai (CN)

( * ) Notice: Subject to any disclaimer, the term of this patent is extended or adjusted under 35 U.S.C. 154(b) by 258 days.

(21) Appl. No.: 17/985,050

(22) Filed: Nov. 10, 2022

(65) Prior Publication Data
US 2023/0155494 A1    May 18, 2023

(30) Foreign Application Priority Data
Nov. 12, 2021    (CN) .......................... 202111337104.8

(51) Int. Cl.
*H02M 3/07*    (2006.01)
*H02M 1/00*    (2006.01)
*H02M 3/156*   (2006.01)

(52) U.S. Cl.
CPC ........... *H02M 3/07* (2013.01); *H02M 1/0058* (2021.05); *H02M 3/1566* (2021.05)

(58) Field of Classification Search
CPC .... H02M 3/07; H02M 3/1566; H02M 1/0058; H02M 3/158; H02M 3/1582
See application file for complete search history.

(56) References Cited

U.S. PATENT DOCUMENTS

2023/0344343 A1*  10/2023  Zhu ...................... H02J 7/0063

FOREIGN PATENT DOCUMENTS

| CN | 110165892 | 8/2019 |
|----|-----------|--------|
| CN | 110729888 | 11/2020 |
| CN | 114070041 | 2/2022 |

* cited by examiner

*Primary Examiner* — Gary L Laxton

(57) ABSTRACT

A switched capacitor voltage converter includes an inductive branch and two branches, by controlling a turning on and off of switch transistors, charges on a parasitic capacitor of one branch are completely transferred to another branch of the two branches via the inductive branch within a period of time after primary switch transistors are turned off, and voltage difference between both terminals of each of the primary switch transistors become zero, and then the primary switch transistors are started to be turned on, the respective voltage differences of the primary switch transistors are zero at a moment when the primary switch transistors are turned on.

5 Claims, 13 Drawing Sheets

SWITCHED CAPACITOR VOLTAGE CONVERTER

CROSS REFERENCE TO THE RELATED APPLICATIONS

This application claims priority to Chinese Patent Application No. 202111337104.8, filed on Nov. 12, 2021, which is hereby incorporated by reference in its entirety.

TECHNICAL FIELD

The present application belongs to the field of switching power supply, and particularly relates to a switched capacitor voltage converter.

BACKGROUND

Dickson switched capacitor voltage converter has a basic power conversion structure and is widely used in a variety of power management applications to convert one direct current (DC) voltage to another DC voltage and output.

FIG. 1 shows a conventional Dickson 4:1 switched capacitor voltage converter, a branch A of a circuit of the Dickson 4:1 switched capacitor voltage converter transfers electric charges from an input terminal to an output terminal via a first switch transistor Q1A—an eighth switch transistor Q8A, a first capacitor CF1A, a second capacitor CF2A and a third capacitor CF3A. In the same way, a branch B of the Dickson 4:1 switched capacitor voltage converter transfers electric charges from the input terminal to the output terminal via a ninth switch transistor Q1B—a sixteenth switch transistor Q8B, a fourth capacitor CF1B, a fifth capacitor CF2B and a sixth capacitor CF3B, so as to finally realize an output voltage VOUT=VIN/4 and an output current IOUT=4*IIN.

Conversion efficiency is an important index of a switched capacitor voltage converter, the conversion efficiency determines a load capacity and temperature rise of the switched capacitor voltage converter. The higher the conversion efficiency, the greater the load capacity of the switched capacitor voltage converter and the lower the temperature rise. The main losses of the switched capacitor voltage converter come from: 1) Conduction loss of each switch transistor in the circuit; 2) Switching loss when each switch transistor is switched; 3) Driving loss of each switch transistor. A key to improving the conversion efficiency is how to reduce the above-mentioned losses. The switching loss is proportional to the voltage difference between both terminals of each switch transistor when switched, and the greater the voltage difference, the greater the switching loss. Therefore, the current switched capacitor voltage converter has problems of low conversion efficiency and large switching loss, which limits the conversion efficiency of the switched capacitor voltage converters.

SUMMARY

In order to overcome the above-mentioned problems, and particularly to the switching loss, embodiments of the present application provide a switched capacitor voltage converter, a voltage difference between both terminals of each switch transistor when switched is decreased to be close to zero or is zero, thereby reducing switching loss and improving conversion efficiency.

In order to solve the above-mentioned problems, an inductor and several switch transistors are added between two branches of a conventional Dickson switched capacitor voltage converter to obtain the switched capacitor voltage converter of embodiments of the present application, in the switched capacitor voltage converter of the embodiments of the present application, by controlling the turning on and off of these switch transistors, an electric charge or electric charges on parasitic capacitors of one branch are completely transferred to another branch via the inductor within a short period of time after all the primary switch transistors are turned off, so that the voltage difference between both terminals of each of the primary switch transistors becomes zero, and then the primary switch transistors are started to be turned on, the voltage difference between both terminals of each of the primary switch transistors is zero at the moment when the primary switch transistors are turned on respectively, thereby reducing the switching loss of the switch transistors and improving the conversion efficiency of the switched capacitor voltage converter.

The technical solution of embodiments of the present application relates to a switched capacitor voltage converter, including an inductive branch and two branches, the two branches include a first branch and a second branch, and an input voltage, upon travelling via the two branches, is converted into another voltage and output.

The inductive branch is connected between the first branch and the second branch, and switch transistors in the first branch and the second branch are primary switch transistors.

The inductive branch is configured to transfer an electric charge or electric charges on parasitic capacitors of one branch to another branch of the two branches after all the primary switch transistors are turned off, so that a voltage difference between both terminals of each of the primary switch transistors becomes zero, and then the each of the primary switch transistors is turned on, the voltage difference between both terminals of the each of the primary switch transistors is zero at an instant when the each of primary switch transistors is turned on respectively.

Furthermore, the first branch includes a first switch transistor, a second switch transistor, a third switch transistor, a fourth switch transistor, a fifth switch transistor, a sixth switch transistor, a seventh switch transistor, an eighth switch transistor, a first capacitor, a second capacitor and a third capacitor; and the second branch includes a ninth switch transistor, a tenth switch transistor, an eleventh switch transistor, a twelfth switch transistor, a thirteenth switch transistor, a fourteenth switch transistor, a fifteenth switch transistor, a sixteenth switch transistor, a fourth capacitor, a fifth capacitor and a sixth capacitor.

A first terminal of the first switch transistor and a first terminal of the ninth switch transistor are connected an input terminal of the switched capacitor voltage converter, the input terminal is connected to an external input voltage, a second terminal of the first switch transistor is connected to a first terminal of the second switch transistor and a first terminal of the first capacitor, and a second terminal of the ninth switch transistor is connected to a first terminal of the tenth switch transistor and a first terminal of the fourth capacitor.

A second terminal of the second switch transistor is connected to a first terminal of the third switch transistor and a first terminal of the second capacitor, and a second terminal of the tenth switch transistor is connected to a first terminal of the eleventh switch transistor and a first terminal of the fifth capacitor.

A second terminal of the third switch transistor is connected to a first terminal of the fourth switch transistor and a first terminal of the third capacitor, and a second terminal of the eleventh switch transistor is connected to a first terminal of the twelfth switch transistor and a first terminal of the sixth capacitor.

A second terminal of the fourth switch transistor is connected to a first terminal of the fifth switch transistor and a first terminal of the seventh switch transistor, and a second terminal of the twelfth switch transistor is connected to a first terminal of the thirteenth switch transistor and a first terminal of the fifteenth switch transistor.

A second terminal of the fifth switch transistor is connected to a second terminal of the first capacitor, a second terminal of the third capacitor and a first terminal of the sixth switch transistor, a second terminal of the seventh switch transistor is connected to a second terminal of the second capacitor and a first terminal of the eighth switch transistor, and a second terminal of the sixth switch transistor and a second terminal of the eighth switch transistor are grounded.

A second terminal of the thirteenth switch transistor is connected to a second terminal of the fourth capacitor, a second terminal of the sixth capacitor and a first terminal of the fourteenth switch transistor, and a second terminal of the fifteenth switch transistor is connected to a second terminal of the fifth capacitor and a first terminal of the sixteenth switch transistor, and a second terminal of the fourteenth switch transistor and a second terminal of the sixteenth switch transistor are grounded.

The second terminal of the fourth switch transistor, the first terminal of the fifth switch transistor, the first terminal of the seventh switch transistor, the second terminal of the twelfth switch transistor, the first terminal of the thirteenth switch transistor and the first terminal of the fifteenth switch transistor are connected to an output terminal of the switched capacitor voltage converter.

Furthermore, the inductive branch includes a seventeenth switch transistor, an eighteenth switch transistor, a nineteenth switch transistor, a twentieth switch transistor, a twenty-first switch transistor, a twenty-second switch transistor and the inductor.

The second terminal of the first capacitor, the second terminal of the third capacitor, the second terminal of the fifth switch transistor and the first terminal of the sixth switch transistor are connected to a first connection point, and the second terminal of the second capacitor, the second terminal of the seventh switch transistor and the first terminal of the eighth switch transistor are connected to a second connection point.

The second terminal of the fourth capacitor, the second terminal of the sixth capacitor, the second terminal of the thirteenth switch transistor and the first terminal of the fourteenth switch transistor are connected to a third connection point, and the second terminal of the fifth capacitor, the second terminal of the fifteenth switch transistor and the first terminal of the sixteenth switch transistor are connected to a fourth connection point.

A first terminal of the seventeenth switch transistor is connected to the second connection point, a second terminal of the seventeenth switch transistor is connected to a first terminal of the inductor, a first terminal of the eighteenth switch transistor and a first terminal of the nineteenth switch transistor; a second terminal of the eighteenth switch transistor is grounded, and a second terminal of the nineteenth switch transistor is connected to the third connection point.

A second terminal of the inductor is connected to a first terminal of the twentieth switch transistor, a first terminal of the twenty-first switch transistor and a first terminal of the twenty-second switch transistor, and a second terminal of the twentieth switch transistor is connected to the fourth connection point; and a second terminal of the twenty-first switch transistor is grounded, and a second terminal of the twenty-second switch transistor is connected to the first connection point.

Furthermore, the first branch includes a first switch transistor, a second switch transistor, a third switch transistor, a fourth switch transistor, a fifth switch transistor, a sixth switch transistor, a seventh switch transistor, an eighth switch transistor, a first sub-switch transistor, a first capacitor, a second capacitor, a third capacitor and a first sub-capacitor; and the second branch includes a ninth switch transistor, a tenth switch transistor, an eleventh switch transistor, a twelfth switch transistor, a thirteenth switch transistor, a fourteenth switch transistor, a fifteenth switch transistor, a sixteenth switch transistor, a second sub-switch transistor, a fourth capacitor, a fifth capacitor, a sixth capacitor and a second sub-capacitor.

A first terminal of the first switch transistor and a first terminal of the ninth switch transistor are connected an input terminal of the switched capacitor voltage converter, the input terminal is connected to an external input voltage, a second terminal of the first switch transistor is connected to a first terminal of the second switch transistor and a first terminal of the first capacitor, and a second terminal of the ninth switch transistor is connected to a first terminal of the tenth switch transistor and a first terminal of the fourth capacitor.

A second terminal of the second switch transistor is connected to a first terminal of the third switch transistor and a first terminal of the second capacitor, a second terminal of the tenth switch transistor is connected to a first terminal of the eleventh switch transistor and a first terminal of the fifth capacitor, a second terminal of the third switch transistor is connected to a first terminal of the fourth switch transistor and a first terminal of the third capacitor, and a second terminal of the eleventh switch transistor is connected to a first terminal of the twelfth switch transistor and a first terminal of the sixth capacitor.

A second terminal of the fourth switch transistor is connected to a first terminal of the fifth switch transistor and a first terminal of the first sub-capacitor, a second terminal of the twelfth switch transistor is connected to a first terminal of the thirteenth switch transistor and a first terminal of the second sub-capacitor, a second terminal of the fifth switch transistor is connected to a first terminal of the sixth switch transistor and a first terminal of the eighth switch transistor, a second terminal of the sixth switch transistor is connected to a second terminal of the first sub-capacitor, a second terminal of the second capacitor and a first terminal of the seventh switch transistor, a second terminal of the eighth switch transistor is connected to a first terminal of the first sub-switch transistor, a second terminal of the first capacitor and a second terminal of the third capacitor, and a second terminal of the seventh switch transistor and a second terminal of the first sub-switch transistor are grounded.

A second terminal of the thirteenth switch transistor is connected to a first terminal of the fourteenth switch transistor and a first terminal of the sixteenth switch transistor, a second terminal of the fourteenth switch transistor is connected to a second terminal of the second sub-capacitor, a second terminal of the fifth capacitor and a first terminal of the fifteenth switch transistor, a second terminal of the sixteenth switch transistor is connected to a first terminal of the second sub-switch transistor, a second terminal of the fourth capacitor and a second terminal of the sixth capacitor, and a second terminal of the fifteenth switch transistor and a second terminal of the second sub-switch transistor are grounded.

The second terminal of the fifth switch transistor, the first terminal of the sixth switch transistor, the first terminal of the eighth switch transistor, the second terminal of the thirteenth switch transistor, the first terminal of the fourteenth switch transistor and the first terminal of the sixteenth switch transistor are connected to the output terminal of the switched capacitor voltage converter.

Furthermore, the second terminal of the first capacitor, the second terminal of the third capacitor, the second terminal of the eighth switch transistor and the first terminal of the first sub-switch transistor are connected to a first connection node; the second terminal of the second capacitor, the second terminal of the first sub-capacitor, the second terminal of the sixth switch transistor and the first terminal of the seventh switch transistor are connected to a second connection node; the second terminal of the fourth capacitor, the second terminal of the sixth capacitor, the second terminal of the sixteenth switch transistor and the first terminal of the second sub-switch transistor are connected to a third connection node; and the second terminal of the fifth capacitor, the second terminal of the second sub-capacitor, the second terminal of the fourteenth switch transistor and the first terminal of the fifteenth switch transistor are connected to a fourth connection node.

The first connection node is connected to a first terminal of the seventeenth switch transistor, a second terminal of the seventeenth switch transistor is connected to a first terminal of the inductor, a first terminal of the eighteenth switch transistor and a first terminal of the nineteenth switch transistor, a second terminal of the eighteenth switch transistor is grounded, and a second terminal of the nineteenth switch transistor is connected to the fourth connection node.

A second terminal of the inductor is connected to a first terminal of the twentieth switch transistor, a first terminal of the twenty-first switch transistor and a first terminal of the twenty-second switch transistor, a second terminal of the twentieth switch transistor is connected to the third connection node, a second terminal of the twenty-first switch transistor is grounded, and a second terminal of the twenty-second switch transistor is connected to the second connection node.

Furthermore, a first working cycle of the switched capacitor voltage converter includes four phases as follows.

A first phase: the first switch transistor, the third switch transistor, the fifth switch transistor, the eighth switch transistor, the tenth switch transistor, the twelfth switch transistor, the fourteenth switch transistor, the fifteenth switch transistor, the seventeenth switch transistor, the nineteenth switch transistor and the twenty-first switch transistor are turned on, and remaining switch transistors are turned off; the input voltage is connected to the output terminal via the first capacitor, the third capacitor is connected in series to the output terminal and then connected in parallel to the second capacitor, the sixth capacitor is connected in parallel to the output terminal, and the fifth capacitor is connected in series to the output terminal and then connected in parallel to the fourth capacitor; and a current on the inductor is zero.

A second phase: the seventeenth switch transistor, the nineteenth switch transistor, the twentieth switch transistor and the twenty-second switch transistor are turned on, and remaining switch transistors are turned off; the current on the inductor increases and then decreases until to zero, and the second phase ends when the current on the inductor decreases to zero.

A third phase: the second switch transistor, the fourth switch transistor, the sixth switch transistor, the seventh switch transistor, the ninth switch transistor, the eleventh switch transistor, the thirteenth switch transistor, the sixteenth switch transistor, the eighteenth switch transistor, the twentieth switch transistor and the twenty-second switch transistor are turned on, and remaining switch transistors are turned off; the third capacitor is connected in parallel to the output terminal, the second capacitor is connected in series to the output terminal and then connected in parallel to the first capacitor, the input voltage is connected to the output terminal via the fourth capacitor, and the sixth capacitor is connected in series to the output terminal and then connected in parallel to the fifth capacitor; and the current on the inductor is zero.

A fourth phase: the seventeenth switch transistor, the nineteenth switch transistor, the twentieth switch transistor and the twenty-second switch transistor are turned on, and remaining switch transistors are turned off; the current on the inductor increases and then decreases until to zero, and the fourth phase ends and the first phase starts when the inductive current decreases to zero.

Furthermore, a second working cycle of the switched capacitor voltage converter includes four phases as follows.

A first phase: the first switch transistor, the third switch transistor, the fifth switch transistor, the eighth switch transistor, the tenth switch transistor, the twelfth switch transistor, the fourteenth switch transistor, the fifteenth switch transistor, the eighteenth switch transistor and the twenty-first switch transistor are turned on, and remaining switch transistors are turned off; and the input voltage is connected to the output terminal via the first capacitor, the third capacitor is connected in series to the output terminal and then connected in parallel to the second capacitor, the sixth capacitor is connected in parallel to the output terminal, and the fifth capacitor is connected in series to the output terminal and then connected in parallel to the fourth capacitor; and a current on the inductor is zero.

A second phase: the seventeenth switch transistor, the nineteenth switch transistor, the twentieth switch transistor and the twenty-second switch transistor are turned on, and remaining switch transistors are turned off; the current on the inductor increases and then decreases until to zero, and the second phase ends when the current on the inductor decreases to zero.

A third phase: the second switch transistor, the fourth switch transistor, the sixth switch transistor, the seventh switch transistor, the ninth switch transistor, the eleventh switch transistor, the thirteenth switch transistor, the sixteenth switch transistor, the eighteenth switch transistor and the twenty-first switch transistor are turned on, and remaining switch transistors are turned off; and the third capacitor is connected in parallel to the output terminal, the second capacitor is connected in series to the output terminal and then connected in parallel to the first capacitor, the input voltage is connected to the output terminal via the fourth capacitor, and the sixth capacitor is connected in series to the output terminal and then connected in parallel to the fifth capacitor; and the current on the inductor is zero.

A fourth phase: the seventeenth switch transistor, the nineteenth switch transistor, the twentieth switch transistor and the twenty-second switch transistor are turned on, and remaining switch transistors are turned off; the current on the inductor increases and then decreases until to zero, the fourth phase ends and the first phase starts when the current on the inductor decreases to zero.

The inductor and the several switch transistors are added between two branches of a conventional Dickson switched capacitor voltage converter to obtain the switched capacitor voltage converter of the embodiments of the present application, in the switched capacitor voltage converter of the embodiments of the present application, by controlling the turning on and off of these switch transistors, the electric charges on the parasitic capacitors of one branch are completely transferred to another branch via the inductor during the dead time when all the primary switch transistors are turned off, thereby achieving zero voltage switching of all the primary switch transistors.

DETAILED DESCRIPTION OF THE EMBODIMENTS

To describe the technical solutions in embodiments of the present application more clearly, the following briefly describes the accompanying drawings required for describing the embodiments. It should be noted that, the embodiments of the present application and the features in the different embodiments may be combined with each other under the condition that they do not conflict with each other.

Figure 1:
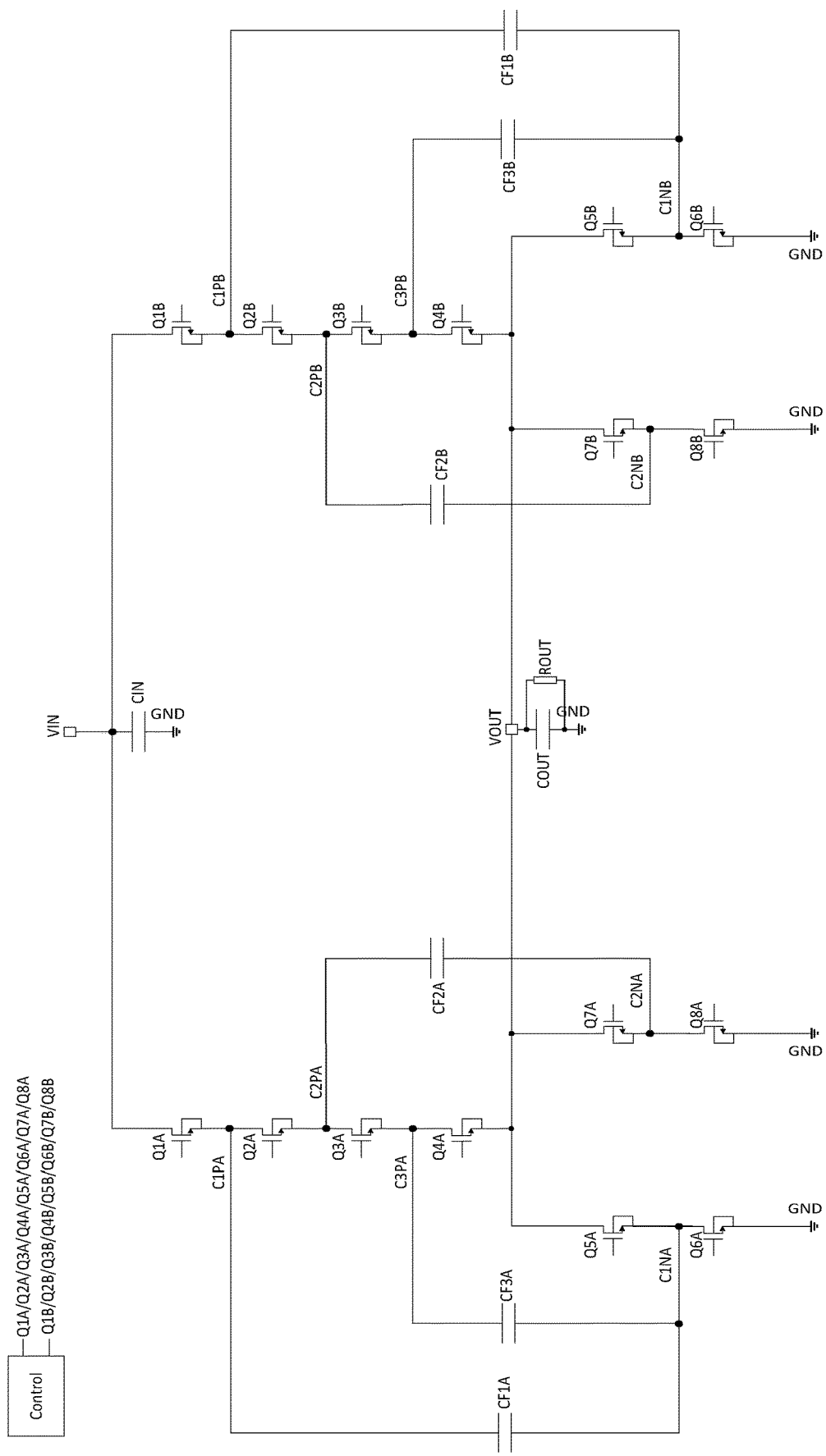
FIG. 1 is a schematic diagram of a circuit structure of a conventional Dickson 4:1 switched capacitor voltage converter.
Figure 2:
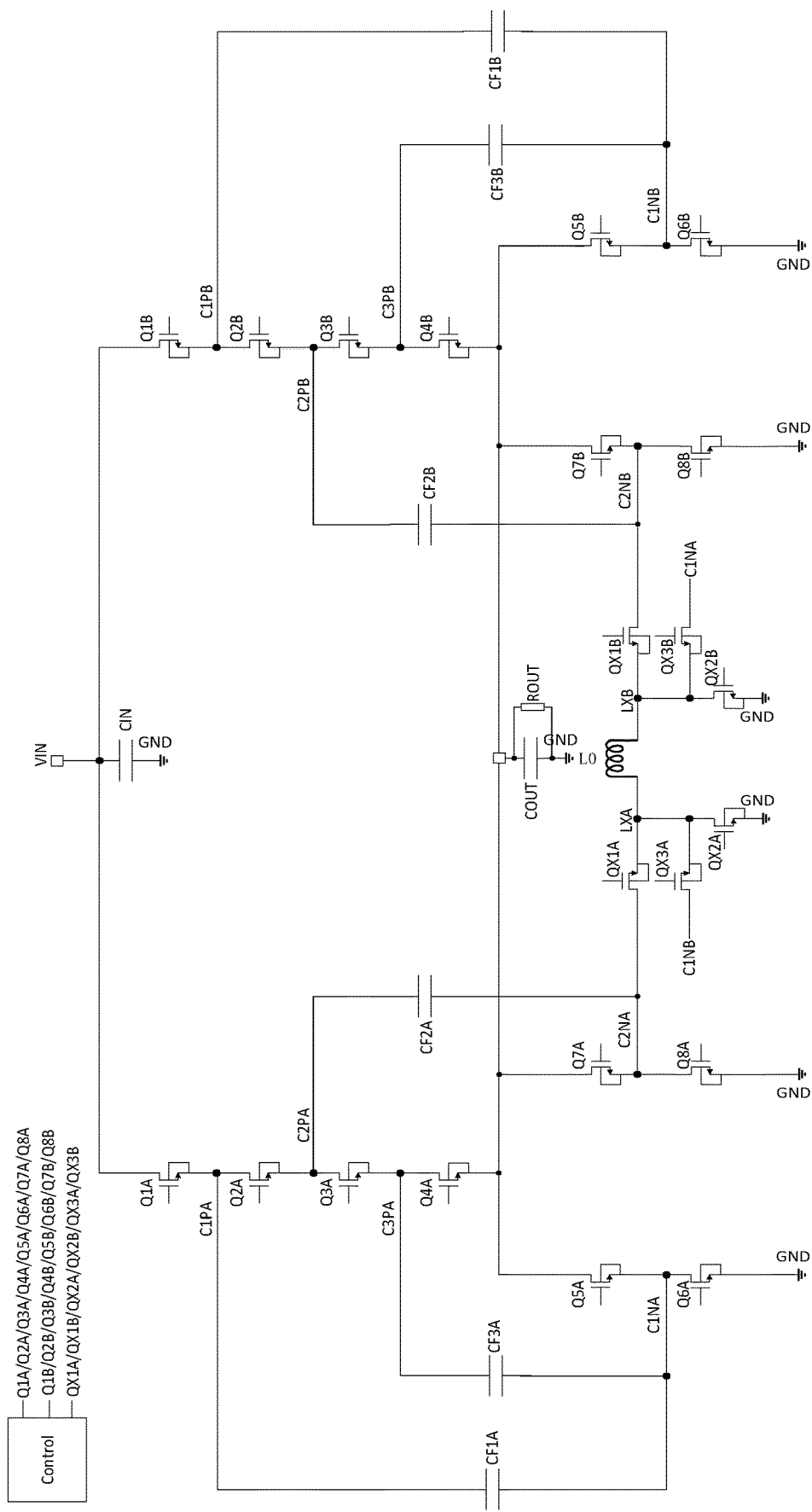
FIG. 2 is a schematic diagram of a circuit structure of a Dickson 4:1 switched capacitor voltage converter of an embodiment of the present application.

FIG. 2 is a schematic diagram of a circuit structure of a Dickson 4:1 switched capacitor voltage converter of an embodiment of the present application, the Dickson 4:1 switched capacitor voltage converter includes an inductive branch and two branches, and the two branches include a first branch and a second branch.

The first branch includes a first switch transistor Q1A, a second switch transistor Q2A, a third switch transistor Q3A, a fourth switch transistor Q4A, a fifth switch transistor Q5A, a sixth switch transistor Q6A, a seventh switch transistor Q7A, an eighth switch transistor Q8A, a first capacitor CF1A, a second capacitor CF2A and a third capacitor CF3A, and the second branch includes a ninth switch transistor Q1B, a tenth switch transistor Q2B, an eleventh switch transistor Q3B, a twelfth switch transistor Q4B, a thirteenth switch transistor Q5B, a fourteenth switch transistor Q6B, a fifteenth switch transistor Q7B, a sixteenth switch transistor Q8B, a fourth capacitor CF1B, a fifth capacitor CF2B and a sixth capacitor CF3B. All switch transistors in the first branch and the second branch are primary switch transistors, each of the primary switch transistors has a parasitic capacitor, for example, each of the first switch transistor Q1A, the second switch transistor Q2A, the third switch transistor Q3A, the fourth switch transistor Q4A, the fifth switch transistor Q5A, the sixth switch transistor Q6A, the seventh switch transistor Q7A, the eighth switch transistor Q8A, the ninth switch transistor Q1B, the tenth switch transistor Q2B, the eleventh switch transistor Q3B, the twelfth switch transistor Q4B, the thirteenth switch transistor Q5B, the fourteenth switch transistor Q6B, the fifteenth switch transistor Q7B and the sixteenth switch transistor Q8B has a parasitic capacitor.

An VIN presents an input voltage, the VIN is connected to GND via a capacitor CIN, the VIN is connected to a node C1PA via the first switch transistor Q1A, the node C1PA is connected to a node C2PA via the second switch transistor Q2A, the node C1PA is connected to a first connection node C1NA via the first capacitor CF1A, the node C2PA is connected to a node C3PA via the third switch transistor Q3A, the node C2PA is connected to a second connection node C2NA via the second capacitor CF2A, a node C3PA is connected to an output voltage VOUT via the fourth switch transistor Q4A, the node C3PA is connected to the first connection node C1NA via the third capacitor CF3A, the fifth switch transistor Q5A is connected between the output voltage VOUT and the first connection node C1NA, the first connection node C1NA is connected to GND via the sixth switch transistor Q6A, the seventh switch transistor Q7A is connected between the output voltage VOUT and the second connection node C2NA, and the second connection node C2NA is connected to GND via the eighth switch transistor Q8A.

Similarly, the VIN is connected to a node C1PB via the ninth switch transistor Q1B, the node C1PB is connected to a node C2PB via the tenth switch transistor Q2B, the node C1PB is connected to a third connection node C1NB via the fourth capacitor CF1B, the node C2PB is connected to a node C3PB via the eleventh switch transistor Q3B, the node C2PB is connected to a fourth connection node C2NB via the fifth capacitor CF2B, the node C3PB is connected to the output voltage VOUT via the twelfth switch transistor Q4B, the node C3PB is connected to the third connection node C1NB via the sixth capacitor CF3B, the thirteenth switch transistor Q5B is connected between the output voltage VOUT and the third connection node C1NB, the third connection node C1NB is connected to GND via the fourteenth switch transistor Q6B, the fifteenth switch transistor Q7B is connected between the output voltage VOUT and the fourth connection node C2NB, and the fourth connection node C2NB is connected to GND via the sixteenth switch transistor Q8B.

The output voltage VOUT is connected to GND via a capacitor COUT, and there is a load resistance ROUT between VOUT and GND.

The inductive branch is connected between the first branch and the second branch of the Dickson 4:1 switched capacitor voltage converter, and the inductive branch includes a seventeenth switch transistor QX1A, an eighteenth switch transistor QX2A, a nineteenth switch transistor QX3A, a twentieth switch transistor QX1B, a twenty-first switch transistor QX2B, a twenty-second switch transistor QX3B and an inductor L0. The second connection node C2NA is connected to a node LXA via the seventeenth switch transistor QX1A, a third connection node C1NB is connected to the node LXA via the nineteenth switch transistor QX3A, the node LXA is connected to GND via the eighteenth switch transistor QX2A, the fourth connection node C2NB is connected to a node LXB via the twentieth switch transistor QX1B, the first connection node C1NA is connected to the node LXB via the twenty-second switch transistor QX3B, the node LXB is connected to GND via the twenty-first switch transistor QX2B, and the node LXA and the node LXB are connected via the inductor L0.

Figure 3:
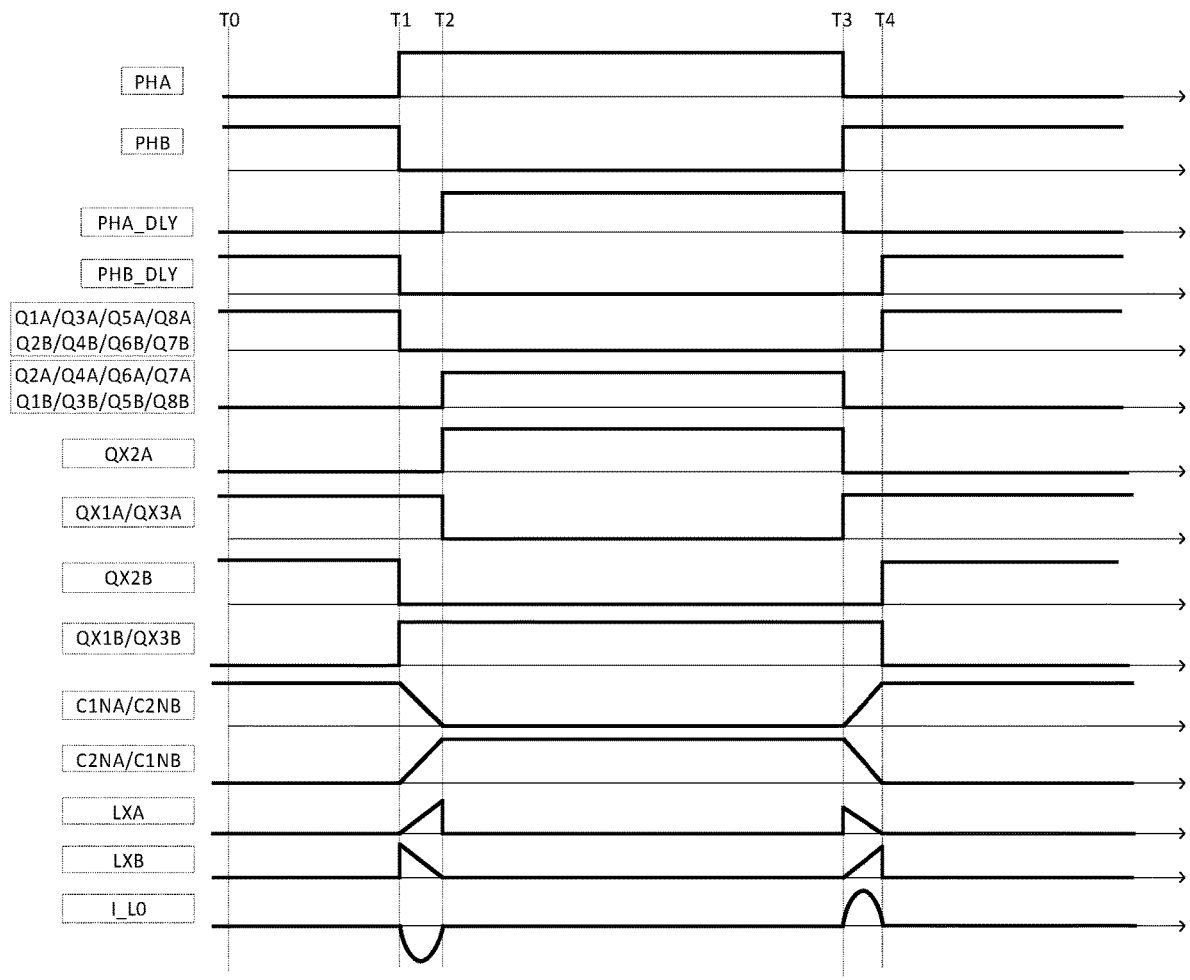
FIG. 3 is a first working sequence diagram of a Dickson 4:1 switched capacitor voltage converter of an embodiment of the present application.

FIG. 3 shows a working sequence of a two-branch Dickson 4:1 switched voltage converter of an embodiment of the present application, there are four working states of phase 1 (T4-T1), phase 2 (T1-T2), phase 3 (T2-T3) and phase 4 (T3-T4) in sequence within one working cycle.

Voltage patterns corresponding to Q1A, Q2A, Q3A, Q4A, Q5A, Q6, Q7A and Q8A present on-off states of the first switch transistor Q1A, the second switch transistor Q2A, the third switch transistor Q3A, the fourth switch transistor Q4A, the fifth switch transistor Q5A, the sixth switch transistor Q6A, the seventh switch transistor Q7A and the eighth switch transistor Q8A respectively. Voltage patterns corresponding to Q1B, Q2B, Q3B, Q4B, Q5B, Q6B, Q7B and Q8B present on-off states of the ninth switch transistor Q1B, the tenth switch transistor Q2B, the eleventh switch transistor Q3B, the twelfth switch transistor Q4B, the thirteenth switch transistor Q5B, the fourteenth switch transistor Q6B, the fifteenth switch transistor Q7B and the sixteenth switch transistor Q8B respectively. Voltage patterns corresponding to QX1A, QX2A, QX3A, QX1B, QX2B and QX3B present on-off states of the seventeenth switch transistor QX1A, the eighteenth switch transistor QX2A, the nineteenth switch transistor QX3A, the twentieth switch transistor QX1B, the twenty-first switch transistor QX2B and the twenty-second switch transistor QX3B respectively. Voltage patterns corresponding to C1NA and C2NB are voltage waveforms of the first connection node C1NA and the fourth connection node C2NB respectively, voltage patterns corresponding to C2NA and C1NB are voltage waveforms of the second connection node C2NA and the third connection node C1NB respectively, voltage patterns corresponding to LXA and LXB are voltage waveforms of nodes LXA and LXB respectively, and current pattern corresponding to I_L0 is a current waveform of the inductor L0.

Figure 4:
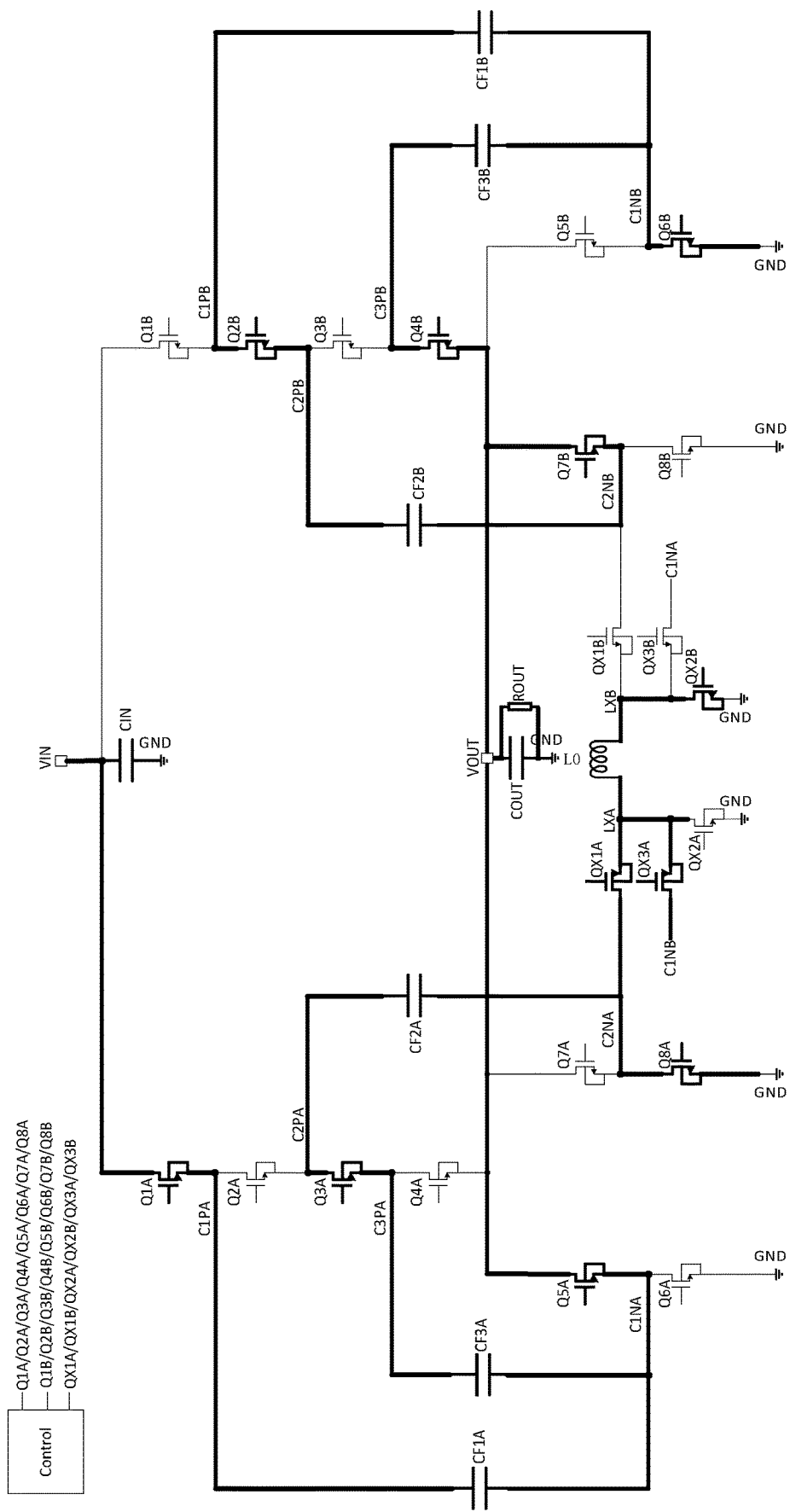
FIG. 4 is a diagram showing a working state of a first phase in the first working sequence as shown in FIG. 3.

FIG. 4 shows a working state of the Dickson switched capacitor converter in the phase 1 (T0-T1). The first switch transistor Q1A, the third switch transistor Q3A, the fifth switch transistor Q5A and the eighth switch transistor Q8A are turned on, the second switch transistor Q2A, the fourth switch transistor Q4A, the sixth switch transistor Q6A and the seventh switch transistor Q7A are turned off, and the input voltage VIN is connected to the output voltage VOUT via the first capacitor CF1A, and the third capacitor CF3A is connected in series to the output voltage VOUT and then connected in parallel to the second capacitor CF2A; the ninth switch transistor Q1B, the eleventh switch transistor Q3B, the thirteenth switch transistor Q5B and the sixteenth switch transistor Q8B are turned off, the tenth switch transistor Q2B, the twelfth switch transistor Q4B, the fourteenth switch transistor Q6B and the fifteenth switch transistor Q7B are turned on, the sixth capacitor CF3B is connected in parallel to the output voltage VOUT, and the fifth capacitor CF2B is connected in series to the output voltage VOUT and then connected in parallel to the fourth capacitor CF1B. The seventeenth switch transistor QX1A, the nineteenth switch transistor QX3A and the twenty-first switch transistor QX2B are turned on, the twentieth switch transistor QX1B, the twenty-second switch transistor QX3B and the eighteenth switch transistor QX2A are turned off, and the second connection node C2NA is connected GND via the seventeenth switch transistor QX1A, the inductor L0 and the twenty-first switch transistor QX2B respectively, the third connection node C1NB is connected to GND via the nineteenth switch transistor QX3A, the inductor L0 and the twenty-first switch transistor QX2B respectively. When phase 4 ends and the phase 1 starts, a voltage of the second connection node C2NA is zero, a voltage of the first connection node C1NA is the output voltage VOUT, a voltage of the node C2PA and a voltage of the node C3PA are twice the output voltage: 2*VOUT, a voltage of the node C1PA is the input voltage VIN, a voltage difference between both terminals of each of the eighth switch transistor Q8A, the fifth switch transistor Q5A, the third switch transistor Q3A and the first switch transistor Q1A is zero before the eighth switch transistor Q8A, the fifth switch transistor Q5A, the third switch transistor Q3A and the first switch transistor Q1A are turned on respectively, and the respective voltage differences of the eighth switch transistor Q8A, the fifth switch transistor Q5A, the third switch transistor Q3A and the first switch transistor Q1A do not change before and after being switched on and off; a voltage of the fourth connection node C2NB is the output voltage VOUT, a voltage of the third connection node C1NB is zero, a voltage of the node C3PB is the output voltage VOUT, a voltage of the node C1PB and a voltage of the node C2PB are three times the output voltage: 3*VOUT, a voltage difference between both terminals of each of the fifteenth switch transistor Q7B, the fourteenth switch transistor Q6B, the twelfth switch transistor Q4B and the tenth switch transistor Q2B is zero before the fifteenth switch transistor Q7B, the fourteenth switch transistor Q6B, the twelfth switch transistor Q4B and the tenth switch transistor Q2B are turned on respectively, and the respective voltage differences of the fifteenth switch transistor Q7B, the fourteenth switch transistor Q6B, the twelfth switch transistor Q4B and the tenth switch transistor Q2B do not change before and after being switched on and off. In the phase 1, a voltage of the first connection node C1NA and a voltage of the fourth connection node C2NB are equal to the output voltage VOUT, a voltage of the second connection node C2NA and a voltage of the third connection node C1NB are equal to zero, a voltage of the node LXA and a voltage of the node LXB are equal to zero, and the current of the inductor L0 is zero.

Figure 5:
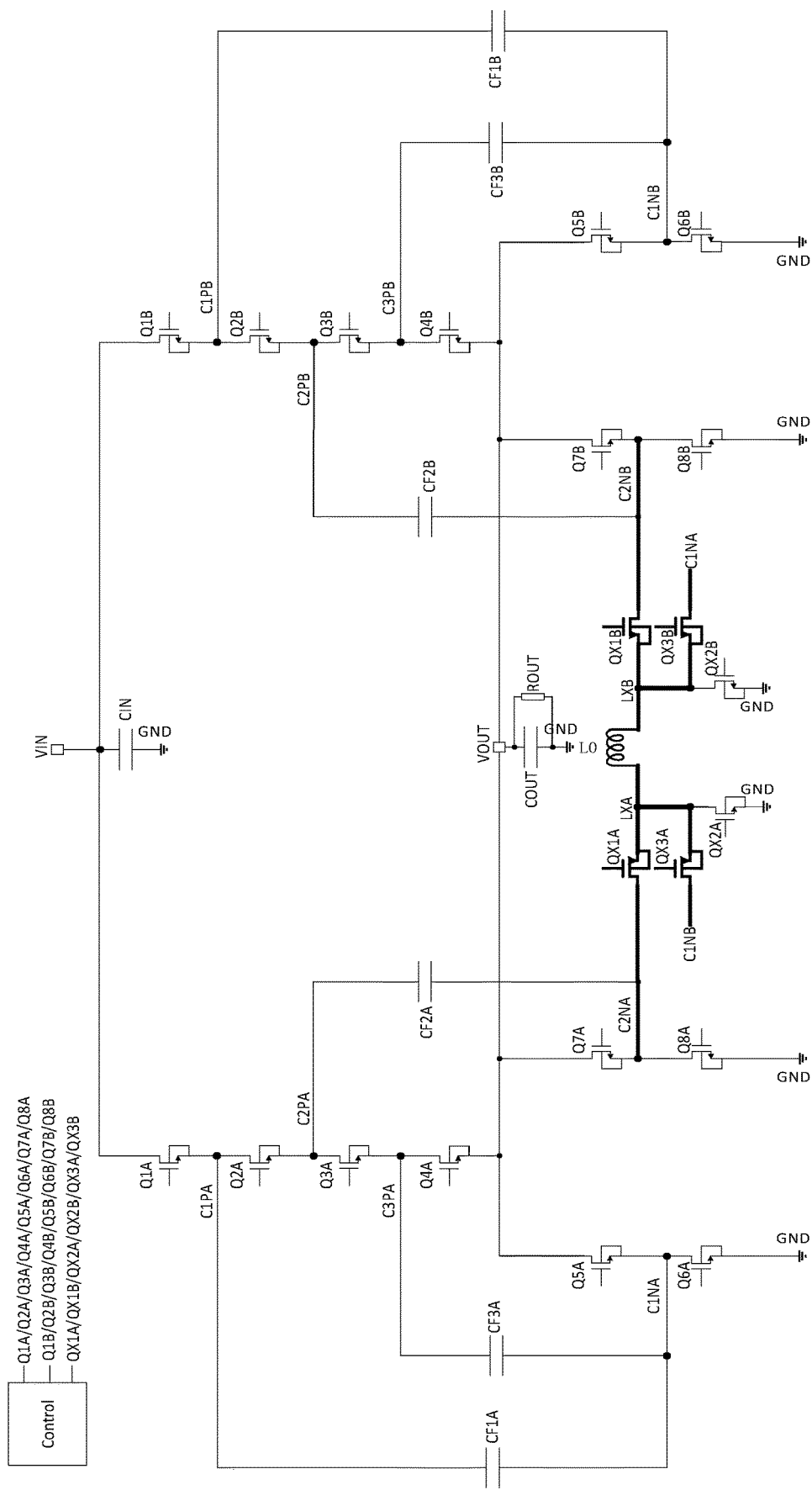
FIG. 5 is a diagram showing a working state of a second phase in the first working sequence as shown in FIG. 3.

FIG. 5 shows a working state of the Dickson switched capacitor converter in the phase 2 (T1-T2). The first switch transistor Q1A, the second switch transistor Q2A, the third switch transistor Q3A, the fourth switch transistor Q4A, the fifth switch transistor Q5A, the sixth switch transistor Q6A, the seventh switch transistor Q7A, the eighth switch transistor Q8A, the ninth switch transistor Q1B, the tenth switch transistor Q2B, the eleventh switch transistor Q3B, the twelfth switch transistor Q4B, the thirteenth switch transistor Q5B, the fourteenth switch transistor Q6B, the fifteenth switch transistor Q7B and the sixteenth switch transistor Q8B are turned off, the eighteenth switch transistor QX2A and the twenty-first switch transistor QX2B are turned off, the seventeenth switch transistor QX1A, the nineteenth switch transistor QX3A, the twentieth switch transistor QX1B and the twenty-second switch transistor QX3B are turned on. The second connection node C2NA and the third connection node C1NB are connected a first terminal of the inductor L0 via the seventeenth switch transistor QX1A and the nineteenth switch transistor QX3A respectively, the fourth connection node C2NB and the first connection node C1NA are connected via a second terminal of the inductor L0 via the twentieth switch transistor QX1B and the twenty-second switch transistor QX3B respectively. At the beginning of the phase 2, a voltage of the fourth connection node C2NB and a voltage of the first connection node C1NA are equal to the output voltage VOUT, and a voltage of the second connection node C2NA and a voltage of the third connection node C1NB are equal to zero. When the fourth connection node C2NB with a high-voltage and the first connection node C1NA with the high-voltage are connected to the second connection node C2NA with a zero-voltage and the third connection node C1NB with the zero-voltage via the inductor L0, the current of the inductor L0 flows from the LXB to the LXA and starts to increase, a voltage of the fourth connection node C2NB and a voltage of the first connection node C1NA decrease, and a voltage of the second connection node C2NA and a voltage of the third connection node C1NB increase; and when the voltage of the fourth connection node C2NB, the voltage of the first connection node C1NA, the voltage of the second connection node C2NA and the voltage of the third connection node C1NB are equal, the current of the inductor L0 reaches a maximum value and then starts to decrease. When the current of the inductor L0 decreases to zero, the voltage of the fourth connection node C2NB and the voltage of the first connection node C1NA decrease to zero, and the voltage of the second connection node C2NA and the voltage of the third connection node C1NB increase to the output voltage VOUT; and meanwhile, the voltage of the node C2PB decreases to 2*VOUT, the voltage of the node C1PA decreases to 3*VOUT, the voltage of the node C3PA decreases to VOUT, the voltage of the node C2PA increases to 3*VOUT, the voltage of the node C1PB increases to the input voltage VIN, and the voltage of the node C3PB increases to 2*VOUT, at this time, the controller controls the switches to end the phase 2 state and start the phase 3.

Figure 6:
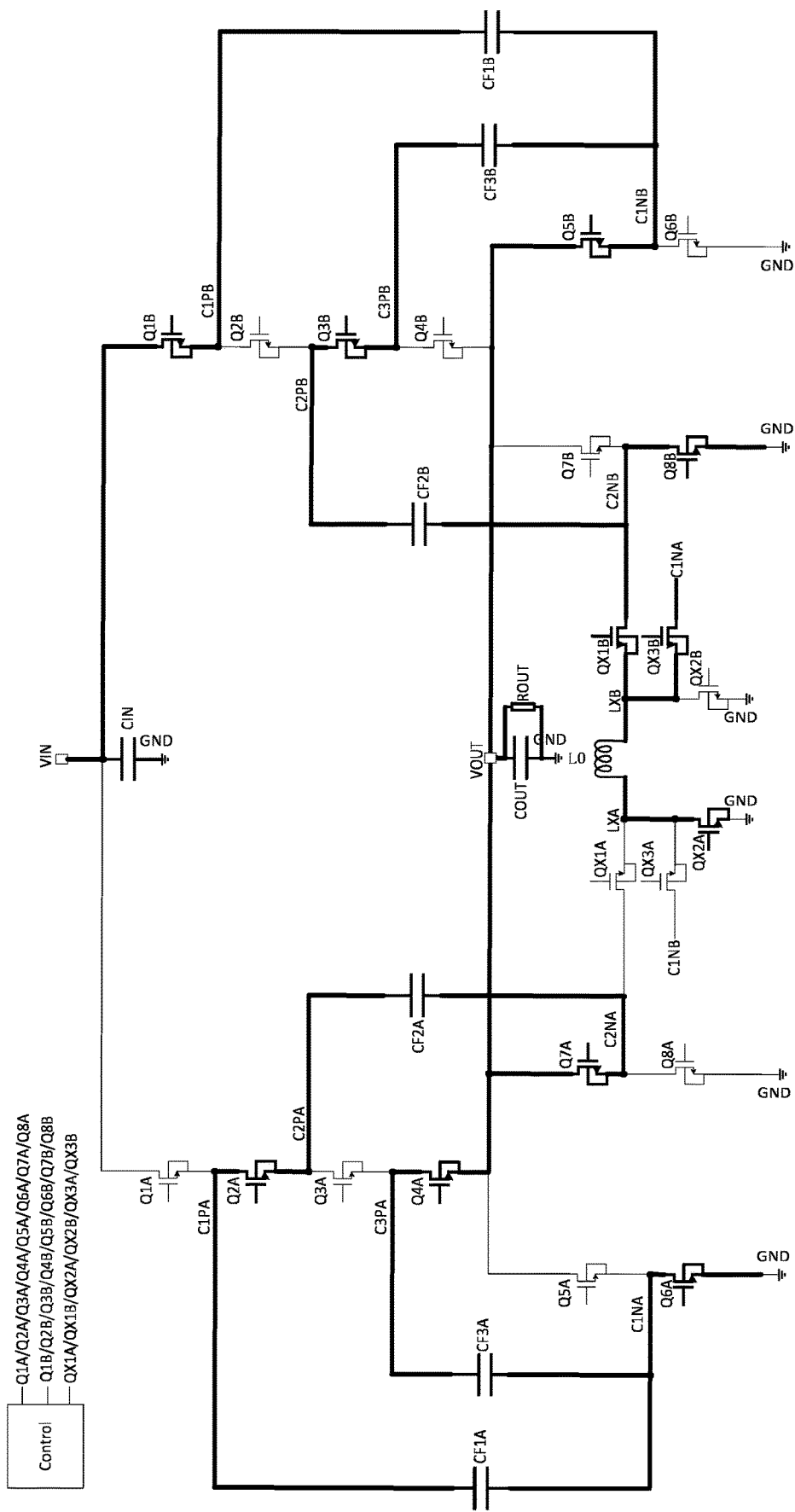
FIG. 6 is a diagram showing a working state of a third phase in the first working sequence as shown in FIG. 3.

FIG. 6 shows a operation of the Dickson switched-capacitor converter in phase 3 (T2-T3). The first switch transistor Q1A, the third switch transistor Q3A, the fifth switch transistor Q5A and the eighth switch transistor Q8A are turned off, the second switch transistor Q2A, the fourth switch transistor Q4A, the sixth switch transistor Q6A and the seventh switch transistor Q7A are turned on, the third capacitor CF3A is connected in parallel to the output voltage VOUT, and the second capacitor CF2A is connected in series to the output voltage VOUT and then connected in parallel to the first capacitor CF1A. The ninth switch transistor Q1B, the eleventh switch transistor Q3B, the thirteenth switch transistor Q5B and the sixteenth switch transistor Q8B are turned on, the tenth switch transistor Q2B, the twelfth switch transistor Q4B, the fourteenth switch transistor Q6B and the fifteenth switch transistor Q7B are turned off, the input voltage VIN is connected to the output voltage VOUT via the fourth capacitor CF1B, and the sixth capacitor CF3B is connected in series to the output voltage VOUT and then connected in parallel to the fifth capacitor CF2B. The seventeenth switch transistor QX1A, the nineteenth switch transistor QX3A and the twenty-first switch transistor QX2B are turned off, the twentieth switch transistor QX1B, the twenty-second switch transistor QX3B and the eighteenth switch transistor QX2A are turned on, and the fourth connection node C2NB is connected to GND via the twentieth switch transistor QX1B, the inductor L0 and the eighteenth switch transistor QX2A respectively, and the first connection node C1NA is connected to GND via the twenty-second switch transistor QX3B, the inductor L0 and the eighteenth switch transistor QX2A respectively. When the phase 2 ends and the phase 3 starts, the voltage of the first connection node C1NA is zero, a voltage of the second connection node C2NA is the output voltage VOUT, a voltage of the node C1PA and a voltage of the node C2PA are three times the output voltage: 3*VOUT, a voltage of the node C3PA is the output voltage VOUT, a voltage difference between both terminals of each the sixth switch transistor Q6A, the seventh switch transistor Q7A, the second switch transistor Q2A and the fourth switch transistor Q4A is zero before the sixth switch transistor Q6A, the seventh switch transistor Q7A, the second switch transistor Q2A and the fourth switch transistor Q4A are turned on respectively, and the respective voltage differences of the sixth switch transistor Q6A, the seventh switch transistor Q7A, the second switch transistor Q2A and the fourth switch transistor Q4A do not change before and after being switched on and off; the voltage of the third connection node C1NB is the output voltage VOUT, the voltage of the fourth connection node C2NB is zero, the voltage of the node C2PB and the voltage of the node C3PB are three times the output voltage: 3*VOUT, the voltage of the node C1PB is the input voltage VIN, a voltage difference between both terminals of each of the thirteenth switch transistor Q5B, the sixteenth switch transistor Q8B, the eleventh switch transistor Q3B and the ninth switch transistor Q1B is zero before the thirteenth switch transistor Q5B, the sixteenth switch transistor Q8B, the eleventh switch transistor Q3B and the ninth switch transistor Q1B are turned on respectively, and the respective voltage differences of the thirteenth switch transistor Q5B, the sixteenth switch transistor Q8B, the eleventh switch transistor Q3B and the ninth switch transistor Q1B do not change before and after being switched on and off. In the phase 3, the voltage of the third connection node C1NB and the voltage of the second connection node C2NA are equal to the output voltage VOUT, the voltage of the fourth connection node C2NB and the voltage of the first connection node C1NA are equal to zero, the voltage of the node LXA and the voltage of the node LXB are equal to zero, and the current of the inductor L0 is zero.

Figure 7:
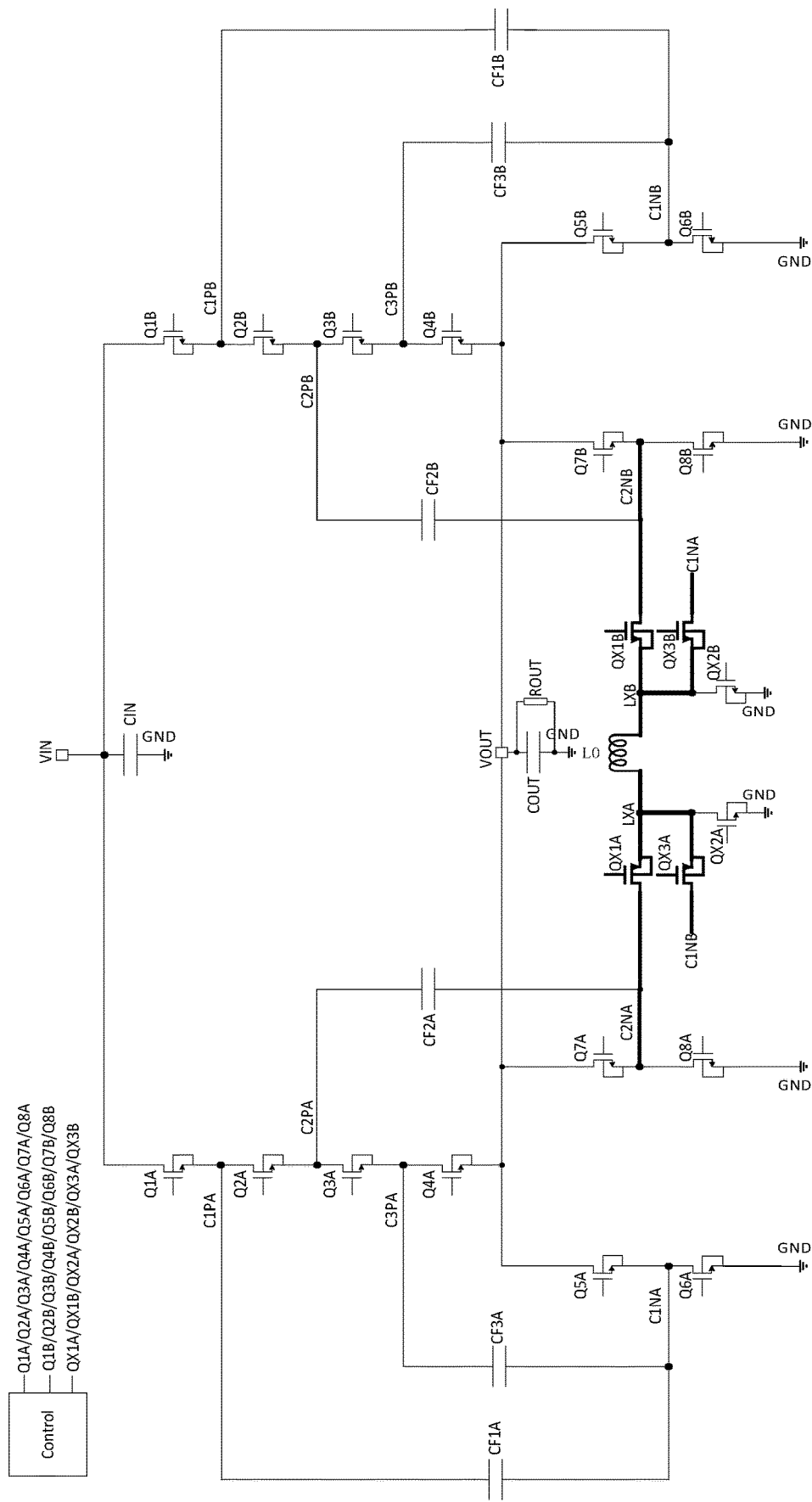
FIG. 7 is a diagram showing a working state of a fourth phase in the first working sequence as shown in FIG. 3.

FIG. 7 shows a working state of the Dickson switched capacitor converter in the phase 4 (T3-T4). The first switch transistor Q1A, the second switch transistor Q2A, the third switch transistor Q3A, the fourth switch transistor Q4A, the fifth switch transistor Q5A, the sixth switch transistor Q6A, the seventh switch transistor Q7A, the eighth switch transistor Q8A, the ninth switch transistor Q1B, the tenth switch transistor Q2B, the eleventh switch transistor Q3B, the twelfth switch transistor Q4B, the thirteenth switch transistor Q5B, the fourteenth switch transistor Q6B, the fifteenth switch transistor Q7B and the sixteenth switch transistor Q8B are turned off, the eighteenth switch transistor QX2A and the twenty-first switch transistor QX2B are turned off, the seventeenth switch transistor QX1A, the nineteenth switch transistor QX3A, the twentieth switch transistor QX1B and the twenty-second switch transistor QX3B are turned on, the second connection node C2NA and the third connection node C1NB are connected a first terminal of the inductor L0 via the seventeenth switch transistor QX1A and the nineteenth switch transistor QX3A respectively, the fourth connection node C2NB and the first connection node C1NA are connected via a second terminal of the inductor L0 via the twentieth switch transistor QX1B and the twenty-second switch transistor QX3B respectively. At the beginning of the phase 4, a voltage of the second connection node C2NA and a voltage of the third connection node C1NB are equal to the output voltage VOUT, and a voltage of the fourth connection node C2NB and a voltage of the first connection node C1NA are equal to zero. When the second connection node C2NA with the high-voltage and the third connection node C1NB with the high-voltage are connected to the fourth connection node C2NB with the zero-voltage and the first connection node C1NA with the zero-voltage via the inductor L0, the current of the inductor L0 flows from the node LXA to the node LXB and starts to increase, a voltage of the second connection node C2NA and a voltage of the third connection node C1NB decrease, and a voltage of the fourth connection node C2NB and a voltage of the first connection node C1NA increase, and when the voltage of the second connection node C2NA, the voltage of the third connection node C1NB, the voltage of the fourth connection node C2NB and the voltage of the first connection node C1NA are equal, the current of the inductor L0 reaches the maximum value and then starts to decrease. When the current of the inductor L0 decreases to zero, the voltage of the second connection node C2NA and the voltage of the third connection node C1NB decrease to zero, and the voltage of the fourth connection node C2NB and the voltage of the first connection node C1NA increase to the output voltage VOUT, and meanwhile, the voltage of the node C2PA decreases to 2*VOUT, the voltage of the node C1PB decreases to 3*VOUT, the voltage of the node C3PB decreases to VOUT, the voltage of the node C2PB increases to 3*VOUT, the voltage of the node C1PA increases to the input node voltage VIN, and the voltage of the node C3PA increases to 2*VOUT, at this time, the controller controls the switches to end the phase 4 and start the phase 1.

As described above, by controlling the seventeenth switch transistor QX1A, the eighteenth switch transistor QX2A, the nineteenth switch transistor QX3A, the twentieth switch transistor QX1B, the twenty-first switch transistor QX2B and the twenty-second switch transistor QX3B, when the Dickson switched capacitor voltage converter of the embodiments of the present application works in the phase 2, electric charges on the first connection node C1NA, the node C1PA, the node C3PA, the fourth connection node C2NB and the node C2PB can be completely transferred to the third connection node C1NB, the node C1PB, the node C3PB, the second connection node C2NA and the node C2PA via the inductor L0, so that, in the phase 3, a voltage difference between both terminals of each of the second switch transistor Q2A, the fourth switch transistor Q4A, the sixth switch transistor Q6A, the seventh switch transistor Q7A, the ninth switch transistor Q1B, the eleventh switch transistor Q3B, the thirteenth switch transistor Q5B and the sixteenth switch transistor Q8B is zero before the second switch transistor Q2A, the fourth switch transistor Q4A, the sixth switch transistor Q6A, the seventh switch transistor Q7A, the ninth switch transistor Q1B, the eleventh switch transistor Q3B, the thirteenth switch transistor Q5B and the sixteenth switch transistor Q8B are turned on respectively. In the phase 4, the electric charges on the third connection node C1NB, the node C1PB, the node C3PB, the second connection node C2NA and the node C2PA are completely transferred to the first connection node C1NA, the node C1PA, the node C3PA, the fourth connection node C2NB and the node C2PB via the inductor L0, so that, in the phase 1, a voltage difference between both terminals of each of the tenth switch transistor Q2B, the twelfth switch transistor Q4B, the fourteenth switch transistor Q6B, the fifteenth switch transistor Q7B, the first switch transistor Q1A, the third switch transistor Q3A, the fifth switch transistor Q5A and the eighth switch transistor Q8A is zero before the tenth switch transistor Q2B, the twelfth switch transistor Q4B, the fourteenth switch transistor Q6B, the fifteenth switch transistor Q7B, the first switch transistor Q1A, the third switch transistor Q3A, the fifth switch transistor Q5A and the eighth switch transistor Q8A are turned on respectively. In this way, a voltage difference between both terminals of each of the first switch transistor Q1A—the eighth switch transistor Q8A and the ninth switch transistor Q1B—the sixteenth switch transistor Q8B is zero each time before these switch transistors are turned on respectively, thereby greatly reducing the switching loss and improving the conversion efficiency of the Dickson switched capacitor voltage converter.

Figure 8:
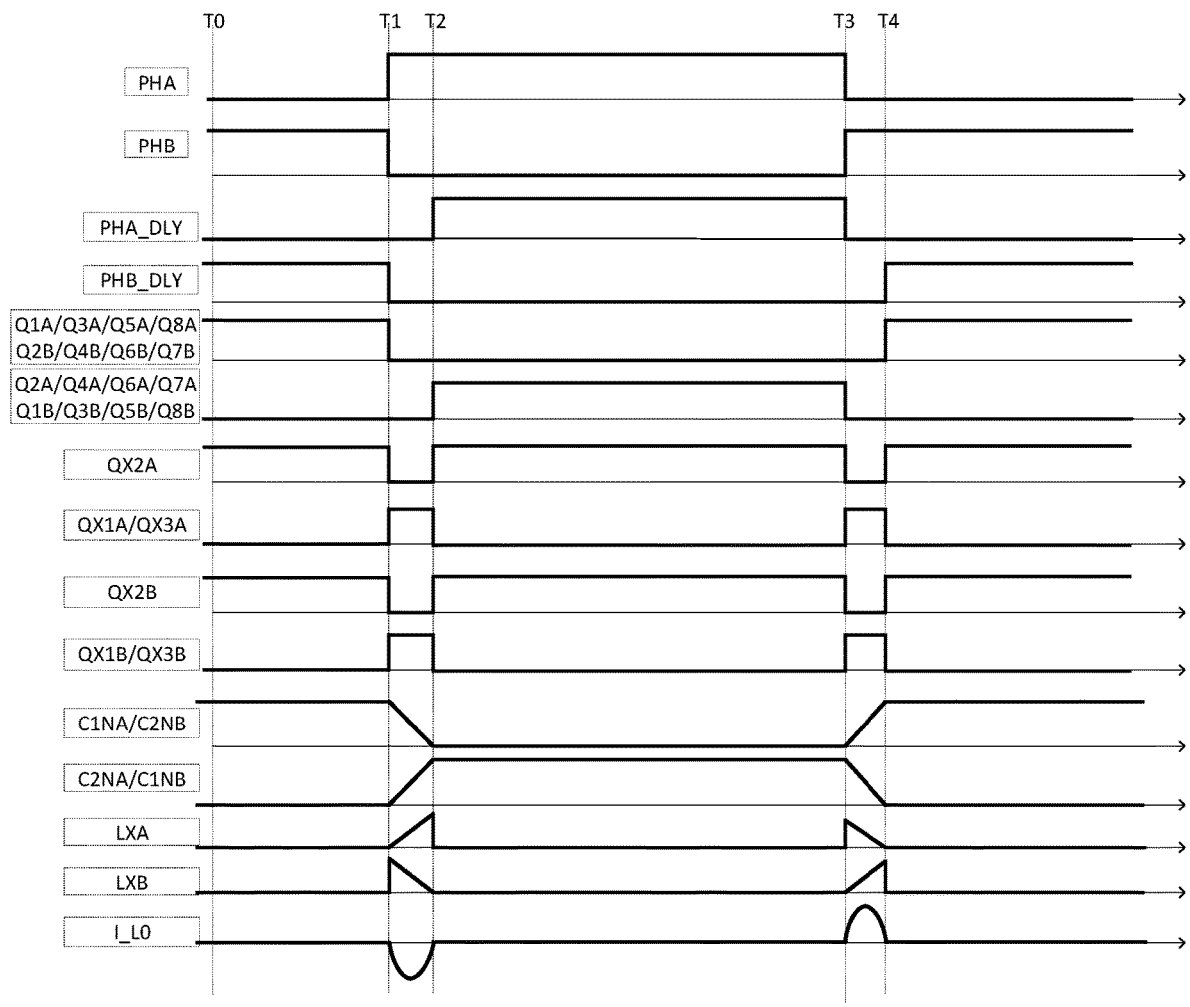
FIG. 8 is a second working sequence diagram of a Dickson 4:1 switched capacitor voltage converter of an embodiment of the present application.

The Dickson switched capacitor voltage converter in FIG. 2 can also work according to the working sequence as shown in FIG. 8, and there are four working states of phase 1 (T0-T1), phase 2 (T1-T2), phase 3 (T2-T3) and phase 4 (T3-T4) in sequence within one working cycle, and the main difference from FIG. 3 is the control sequence of the seventeenth switch transistor QX1A, the twentieth switch transistor QX1B, the eighteenth switch transistor QX2A, the twenty-first switch transistor QX2B, the nineteenth switch transistor QX3A and the twenty-second switch transistor QX3B. This control method can also achieve the effect of decreasing the respective voltage differences between both terminals of the first switch transistor Q1A—the eighth switch transistor Q8A and the ninth switch transistor Q1B—the sixteenth switch transistor Q8B to zero before these switch transistors are turned on.

Figure 9:
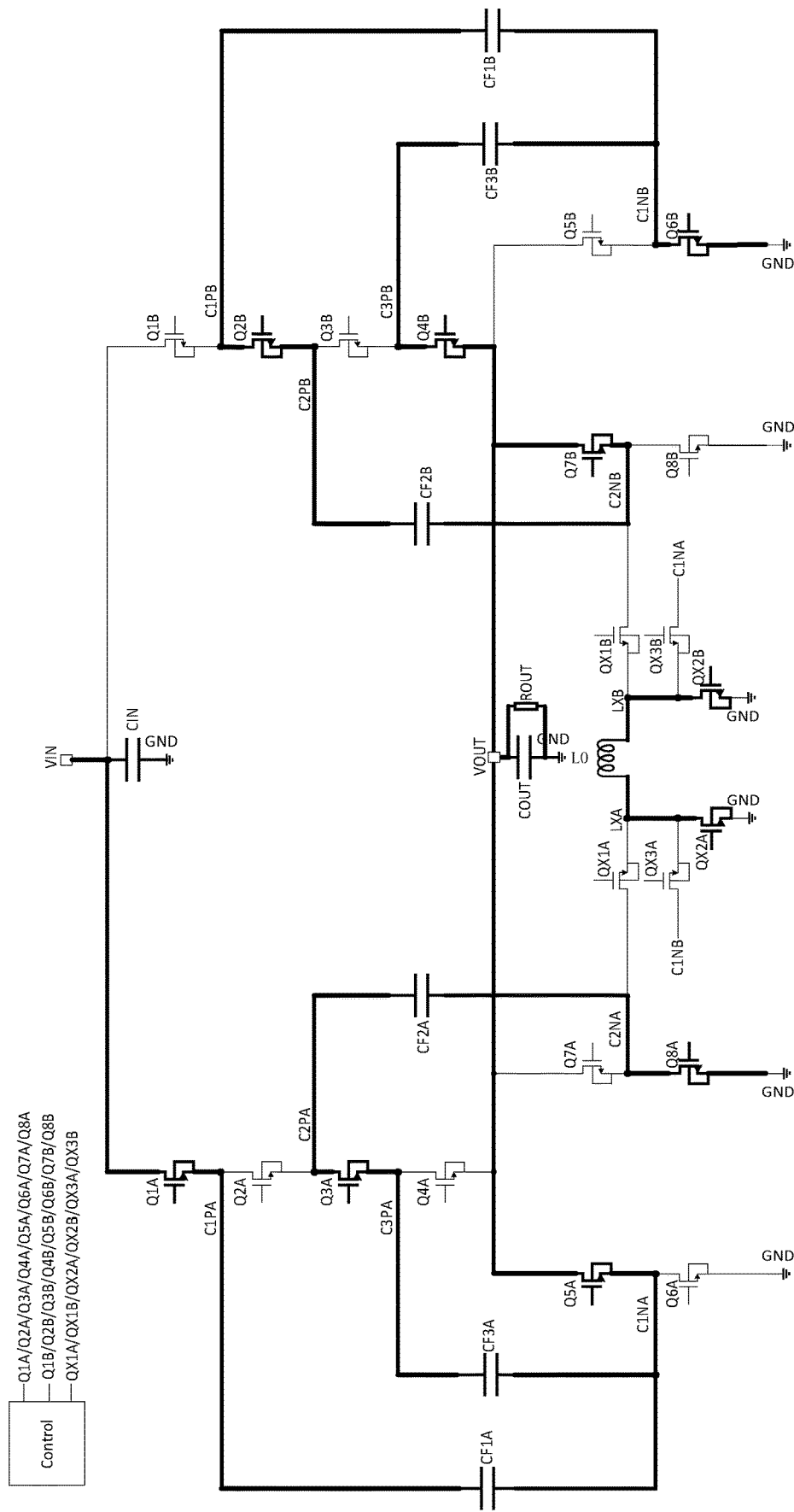
FIG. 9 is a diagram showing a working state of a first phase in the second working sequence as shown in FIG. 8.

FIG. 9 shows a working state of the Dickson switched capacitor converter in the phase 1 (T0-T1). The first switch transistor Q1A, the third switch transistor Q3A, the fifth switch transistor Q5A and the eighth switch transistor Q8A are turned on, the second switch transistor Q2A, the fourth switch transistor Q4A, the sixth switch transistor Q6A and the seventh switch transistor Q7A are turned off, the input voltage VIN is connected to the output voltage VOUT via the first capacitor CF1A, and the third capacitor CF3A is connected in series to the output voltage VOUT and then connected in parallel to the second capacitor CF2A. The ninth switch transistor Q1B, the eleventh switch transistor Q3B, the thirteenth switch transistor Q5B and the sixteenth switch transistor Q8B are turned off, the tenth switch transistor Q2B, the twelfth switch transistor Q4B, the fourteenth switch transistor Q6B and the fifteenth switch transistor Q7B are turned on, the sixth capacitor CF3B is connected in parallel to the output voltage VOUT, and the fifth capacitor CF2B is connected in series to the output voltage VOUT and then connected in parallel to the fourth capacitor CF1B. The eighteenth switch transistor QX2A and the twenty-first switch transistor QX2B are turned on, the seventeenth switch transistor QX1A, the twentieth switch transistor QX1B, the nineteenth switch transistor QX3A and the twenty-second switch transistor QX3B are turned off, and the node LXA and the node LXB are connected to GND via the eighteenth switch transistor QX2A and the twenty-first switch transistor QX2B respectively. When the phase 4 ends and the phase 1 starts, a voltage of the second connection node C2NA is zero, a voltage of the first connection node C1NA is the output voltage VOUT, a voltage of the node C2PA and a voltage of the node C3PA are twice the output voltage 2*VOUT, a voltage of the node C1PA is the input voltage VIN, a voltage difference between both terminals of each of the eighth switch transistor Q8A, the fifth switch transistor Q5A, the third switch transistor Q3A and the first switch transistor Q1A is zero before the eighth switch transistor Q8A, the fifth switch transistor Q5A, the third switch transistor Q3A and the first switch transistor Q1A are turned on respectively, and the respective voltage differences of the eighth switch transistor Q8A, the fifth switch transistor Q5A, the third switch transistor Q3A and the first switch transistor Q1A do not change before and after being switched on and off. The voltage of the fourth connection node C2NB is the output voltage VOUT, the voltage of the third connection node C1NB is zero, the voltage of the node C3PB is the output voltage VOUT, the voltage of the node C1PB and the voltage of the node C2PB are three times the output voltage: 3*VOUT, a voltage difference between both terminals of each of the fifteenth switch transistor Q7B, the fourteenth switch transistor Q6B, the twelfth switch transistor Q4B and the tenth switch transistor Q2B is zero before the fifteenth switch transistor Q7B, the fourteenth switch transistor Q6B, the twelfth switch transistor Q4B and the tenth switch transistor Q2B are turned on respectively, and the respective voltage differences of the fifteenth switch transistor Q7B, the fourteenth switch transistor Q6B, the twelfth switch transistor Q4B and the tenth switch transistor Q2B do not change before and after being switched on and off. In the phase 1, the voltage of the first connection node C1NA and the voltage of the fourth connection node C2NB are equal to the output voltage VOUT, the voltage of the second connection node C2NA and the voltage of the third connection node C1NB are equal to zero, the voltage of the node LXA and the voltage of the node LXB are equal to zero, and the inductor L0 current is zero.

Figure 10:
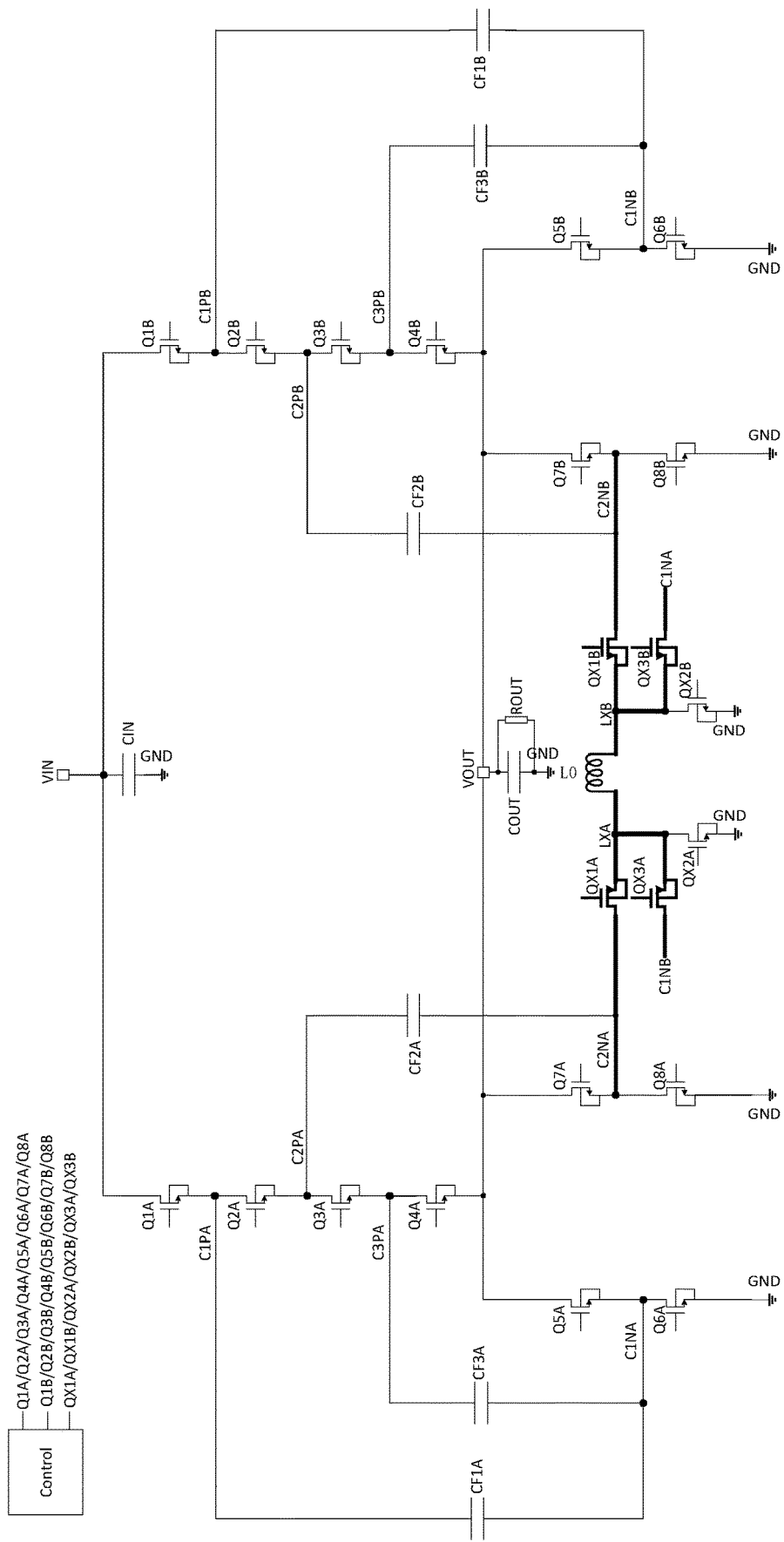
FIG. 10 is a diagram showing a working state of a second phase in the second working sequence as shown in FIG. 8.

FIG. 10 shows a working state of the Dickson switched capacitor converter in the phase 2 (T1-T2). The first switch transistor Q1A, the second switch transistor Q2A, the third switch transistor Q3A, the fourth switch transistor Q4A, the fifth switch transistor Q5A, the sixth switch transistor Q6A, the seventh switch transistor Q7A, the eighth switch transistor Q8A, the ninth switch transistor Q1B, the tenth switch transistor Q2B, the eleventh switch transistor Q3B, the twelfth switch transistor Q4B, the thirteenth switch transistor Q5B, the fourteenth switch transistor Q6B, the fifteenth switch transistor Q7B and the sixteenth switch transistor Q8B are turned off, the eighteenth switch transistor QX2A and the twenty-first switch transistor QX2B are turned off, the seventeenth switch transistor QX1A, the nineteenth switch transistor QX3A, the twentieth switch transistor QX1B and the twenty-second switch transistor QX3B are turned on, and the second connection node C2NA and the third connection node C1NB are connected to a first terminal of the inductor L0 via the seventeenth switch transistor QX1A and the nineteenth switch transistor QX3A respectively, and the fourth connection node C2NB and the first connection node C1NA are connected to a second terminal of the inductor L0 via the twentieth switch transistor QX1B and the twenty-second switch transistor QX3B respectively. At the beginning of the phase 2, the voltage of the fourth connection node C2NB and the voltage of the first connection node C1NA are equal to the output voltage VOUT, and the voltage of the second connection node C2NA and the voltage of the third connection node C1NB are equal to zero. When the fourth connection node C2NB with the high-voltage and the first connection node C1NA with the high-voltage are connected to the second connection node C2NA with the zero-voltage and the third connection node C1NB with the zero-voltage via the inductor L0, the current of the inductor L0 flows from the LXB to the LXA and starts to increase, the voltage of the fourth connection node C2NB and the voltage of the first connection node C1NA decrease, and the voltage of the second connection node C2NA and the voltage of the third connection node C1NB increase. When the voltage of the fourth connection node C2NB, the voltage of the first connection node C1NA, the voltage of the second connection node C2NA and the voltage of the third connection node C1NB are equal, the current of the inductor L0 reaches the maximum value and then starts to decrease. When the current of the inductor L0 decreases to zero, the voltage of the fourth connection node C2NB and the voltage of the first connection node C1NA decrease to zero, and the voltage of the second connection node C2NA and the voltage of the third connection node C1NB increase to the output voltage VOUT, and meanwhile, the voltage of the node C2PB decreases to 2*VOUT, the voltage of the node C1PA decreases to 3*VOUT, the voltage of the node C3PA decreases to VOUT, the voltage of the node C2PA increases to 3*VOUT, the voltage of the node C1PB increases to the input node voltage VIN, and the voltage of the node C3PB increases to 2*VOUT, at this time, the controller controls the switches to end the phase 2 and start the phase 3.

Figure 11:
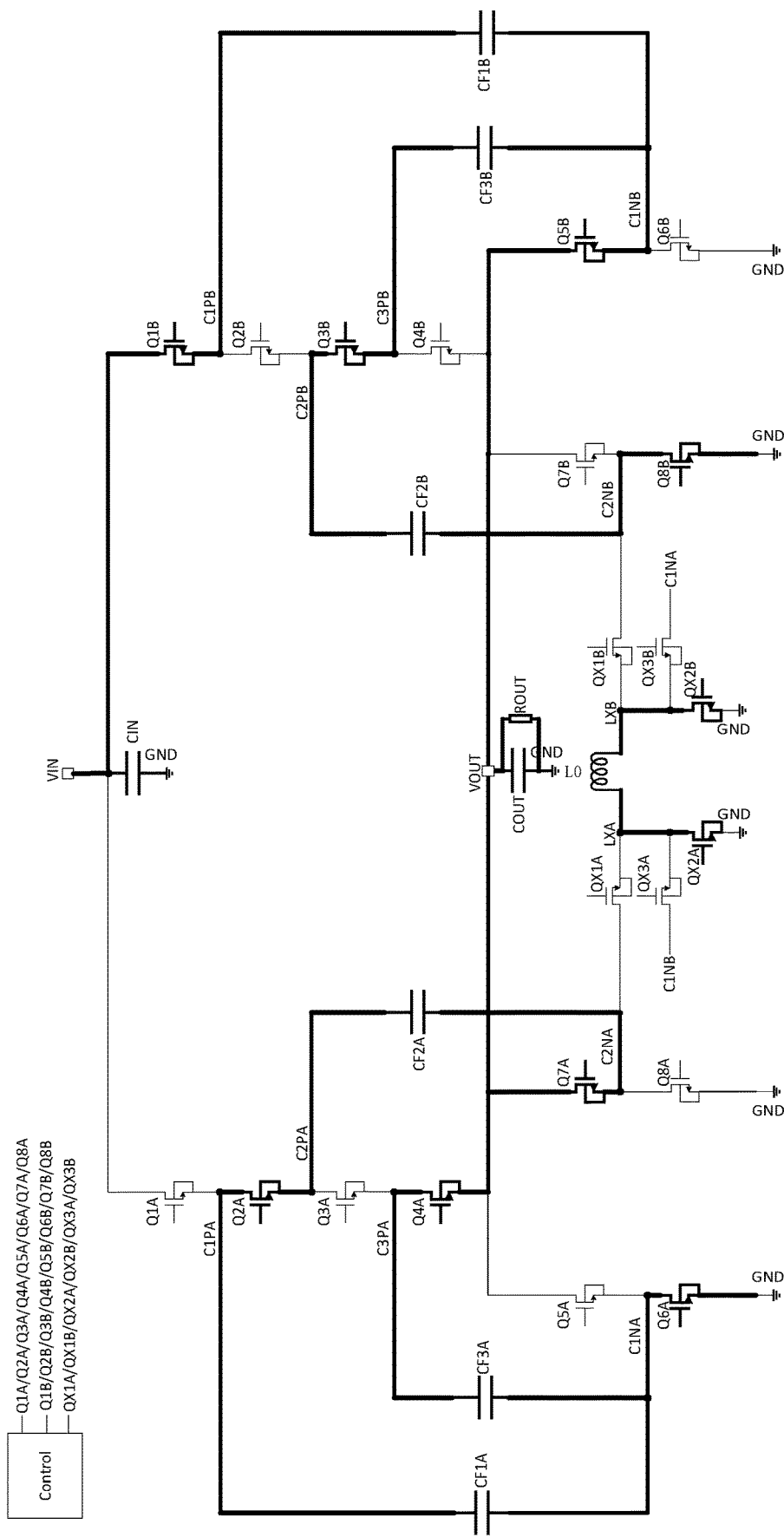
FIG. 11 is a diagram showing a working state of a third phase in the second working sequence as shown in FIG. 8.

FIG. 11 shows a working state of the Dickson switched capacitor converter in the phase 3 (T2-T3). The first switch transistor Q1A, the third switch transistor Q3A, the fifth switch transistor Q5A and the eighth switch transistor Q8A are turned off, the second switch transistor Q2A, the fourth switch transistor Q4A, the sixth switch transistor Q6A and the seventh switch transistor Q7A are turned on, the third capacitor CF3A is connected in parallel to the output voltage VOUT, and the second capacitor CF2A is connected in series to the output voltage VOUT and then connected in parallel to the first capacitor CF1A. The ninth switch transistor Q1B, the eleventh switch transistor Q3B, the thirteenth switch transistor Q5B and the sixteenth switch transistor Q8B are turned on, the tenth switch transistor Q2B, the twelfth switch transistor Q4B, the fourteenth switch transistor Q6B and the fifteenth switch transistor Q7B are turned off, the input voltage VIN is connected to the output voltage VOUT via the fourth capacitor CF1B, and the sixth capacitor CF3B is connected in series to the output voltage VOUT and then connected in parallel to the fifth capacitor CF2B. The seventeenth switch transistor QX1A, the nineteenth switch transistor QX3A, the twentieth switch transistor QX1B and the twenty-second switch transistor QX3B are turned off, the eighteenth switch transistor QX2A and the twenty-first switch transistor QX2B are turned on, the node LXA is connected to GND via the eighteenth switch transistor QX2A, and the node LXB is connected to GND via the twenty-first switch transistor QX2B. When the phase 2 ends and the phase 3 starts, the voltage of the first connection node C1NA is zero, the voltage of the second connection node C2NA is the output voltage VOUT, the voltage of the node C1PA and the voltage of the node C2PA are three times the output voltage: 3*VOUT, the voltage of the node C3PA is the output voltage VOUT, a voltage difference between both terminals of each of the sixth switch transistor Q6A, the seventh switch transistor Q7A, the second switch transistor Q2A and the fourth switch transistor Q4A is zero before the sixth switch transistor Q6A, the seventh switch transistor Q7A, the second switch transistor Q2A and the fourth switch transistor Q4A are turned on respectively, and the respective voltage differences of the sixth switch transistor Q6A, the seventh switch transistor Q7A, the second switch transistor Q2A and the fourth switch transistor Q4A do not change before and after being switched on and off. The voltage of the third connection node C1NB is the output voltage VOUT, the voltage of the fourth connection node C2NB is zero, the voltage of the node C2PB and the voltage of the node C3PB are three times the output voltage: 3*VOUT, the voltage of the node C1PB is the input voltage VIN, a voltage difference between both terminals of each of the thirteenth switch transistor Q5B, the sixteenth switch transistor Q8B, the eleventh switch transistor Q3B and the ninth switch transistor Q1B is zero before the thirteenth switch transistor Q5B, the sixteenth switch transistor Q8B, the eleventh switch transistor Q3B and the ninth switch transistor Q1B turned on respectively, and the respective voltage differences of the thirteenth switch transistor Q5B, the sixteenth switch transistor Q8B, the eleventh switch transistor Q3B and the ninth switch transistor Q1B do not change before and after being switched on and off. In the phase 3, the voltage of the third connection node C1NB and the voltage of the second connection node C2NA are equal to the output voltage VOUT, the voltage of the fourth connection node C2NB and the voltage of the first connection node C1NA are equal to zero, the voltage of the node LXA and the voltage of the node LXB are equal to zero, and the current of the inductor L0 is zero.

Figure 12:
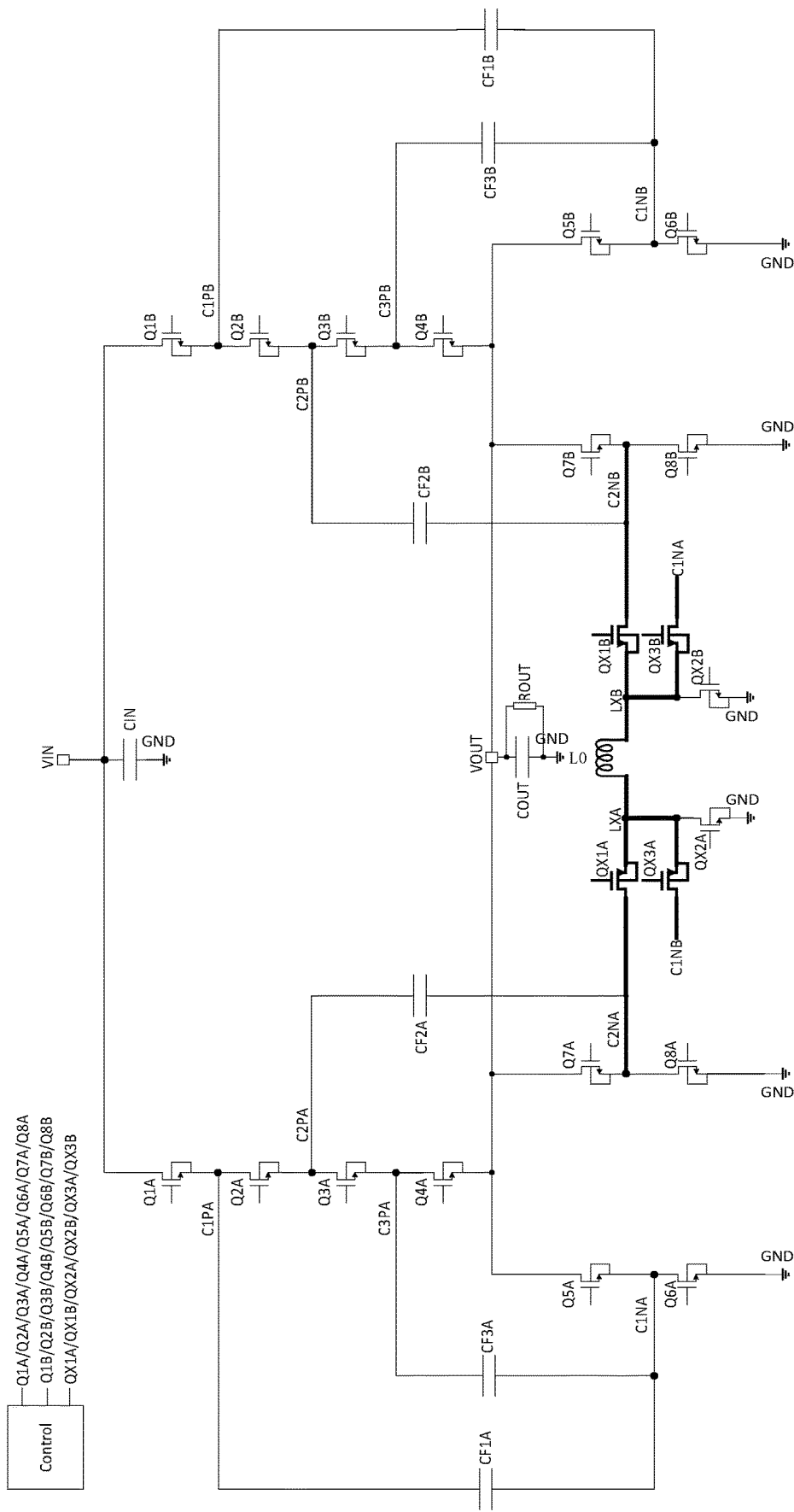
FIG. 12 is a diagram showing a working state of a fourth phase in the second working sequence as shown in FIG. 8.

FIG. 12 shows a working state of the Dickson switched capacitor converter in the phase 4 (T3-T4). The first switch transistor Q1A, the second switch transistor Q2A, the third switch transistor Q3A, the fourth switch transistor Q4A, the fifth switch transistor Q5A, the sixth switch transistor Q6A, the seventh switch transistor Q7A, the eighth switch transistor Q8A, the ninth switch transistor Q1B, the tenth switch transistor Q2B, the eleventh switch transistor Q3B, the twelfth switch transistor Q4B, the thirteenth switch transistor Q5B, the fourteenth switch transistor Q6B, the fifteenth switch transistor Q7B and the sixteenth switch transistor Q8B are turned off, the eighteenth switch transistor QX2A and the twenty-first switch transistor QX2B are turned off, the seventeenth switch transistor QX1A, the nineteenth switch transistor QX3A, the twentieth switch transistor QX1B and the twenty-second switch transistor QX3B are turned on, the second connection node C2NA and the third connection node C1NB are connected to a first terminal of the inductor L0 via the seventeenth switch transistor QX1A and the nineteenth switch transistor QX3A respectively, and the fourth connection node C2NB and the first connection node C1NA are connected to a second terminal of the inductor L0 via the twentieth switch transistor QX1B and the twenty-second switch transistor QX3B respectively. At the beginning of the phase 4, the voltage of the second connection node C2NA and the voltage of the third connection node C1NB are equal to the output voltage VOUT, and the voltage of the fourth connection node C2NB and the voltage of the first connection node C1NA are equal to zero, and when the second connection node C2NA with the high-voltage and the third connection node C1NB with the high-voltage are connected to the fourth connection node C2NB with the zero-voltage and the first connection node C1NA with the zero-voltage via the inductor L0, the current of the inductor L0 flows from the node LXA to the node LXB and starts to increase, the voltage of the second connection node C2NA and the voltage of the third connection node C1NB decrease, and the voltage of the fourth connection node C2NB and the voltage of the first connection node C1NA increase, when the voltage of the second connection node C2NA, the voltage of the third connection node C1NB, the voltage of the nodes the fourth connection node C2NB and the voltage of the first connection node C1NA are equal, the current of the inductor L0 reaches the maximum value and then starts to decrease. When the current of the inductor L0 decrease s to zero, the voltage of the second connection node C2NA and the voltage of the third connection node C1NB decrease to zero, the voltage of the fourth connection node C2NB and the voltage of the first connection node C1NA increase to the output voltage VOUT; and meanwhile, the voltage of the node C2PA decreases to 2*VOUT, the voltage of the node C1PB decreases to 3*VOUT, the voltage of the node C3PB decreases to VOUT, the voltage of the node C2PB increases to 3*VOUT, the voltage of the node C1PA increases to the input node voltage VIN, and the voltage of the node C3PA increases to 2*VOUT, at this time, the controller controls the switches to end the phase 4 and start the phase 1.

According to the Dickson switched capacitor voltage converter of embodiments of the present application, by controlling the seventeenth switch transistor QX1A, the eighteenth switch transistor QX2A, the nineteenth switch transistor QX3A, the twentieth switch transistor QX1B, the twenty-first switch transistor QX2B and the twenty-second switch transistor QX3B according to above-mentioned two control sequences, the electric charges on the first connection node C1NA, the node C1PA, the node C3PA, the fourth connection node C2NB and the node C2PB are completely transferred to the third connection node C1NB, the node C1PB, the node C3PB, the second connection node C2NA and the node C2PA via the inductor L0 in the phase 2, so that, in the phase 3, the voltage difference between both terminals of each of the second switch transistor Q2A, the fourth switch transistor Q4A, the sixth switch transistor Q6A, the seventh switch transistor Q7A, the ninth switch transistor Q1B, the eleventh switch transistor Q3B, the thirteenth switch transistor Q5B and the sixteenth switch transistor Q8B is zero before these switch transistors are turned on respectively. In the phase 4, the electric charges on the third connection node C1NB, the node C1PB, the node C3PB, the second connection node C2NA and the node C2PA are completely transferred to the first connection node C1NA, the node C1PA, the node C3PA, the fourth connection node C2NB and the node C2PB via the inductor L0, so that, in the phase 1, the voltage difference between both terminals of each of the tenth switch transistor Q2B, the twelfth switch transistor Q4B, the fourteenth switch transistor Q6B, the fifteenth switch transistor Q7B, the first switch transistor Q1A, the third switch transistor Q3A, the fifth switch transistor Q5A and the eighth switch transistor Q8A is zero before these switch transistors are turned on respectively. In this way, the voltage difference between both terminals of each of the first switch transistor Q1A—the eighth switch transistor Q8A and the ninth switch transistor Q1B—the sixteenth switch transistor Q8B is zero before these switch transistor are turned on respectively, thereby greatly reducing the switching loss and improving the conversion efficiency of the Dickson switched capacitor voltage converter.

Figure 13:
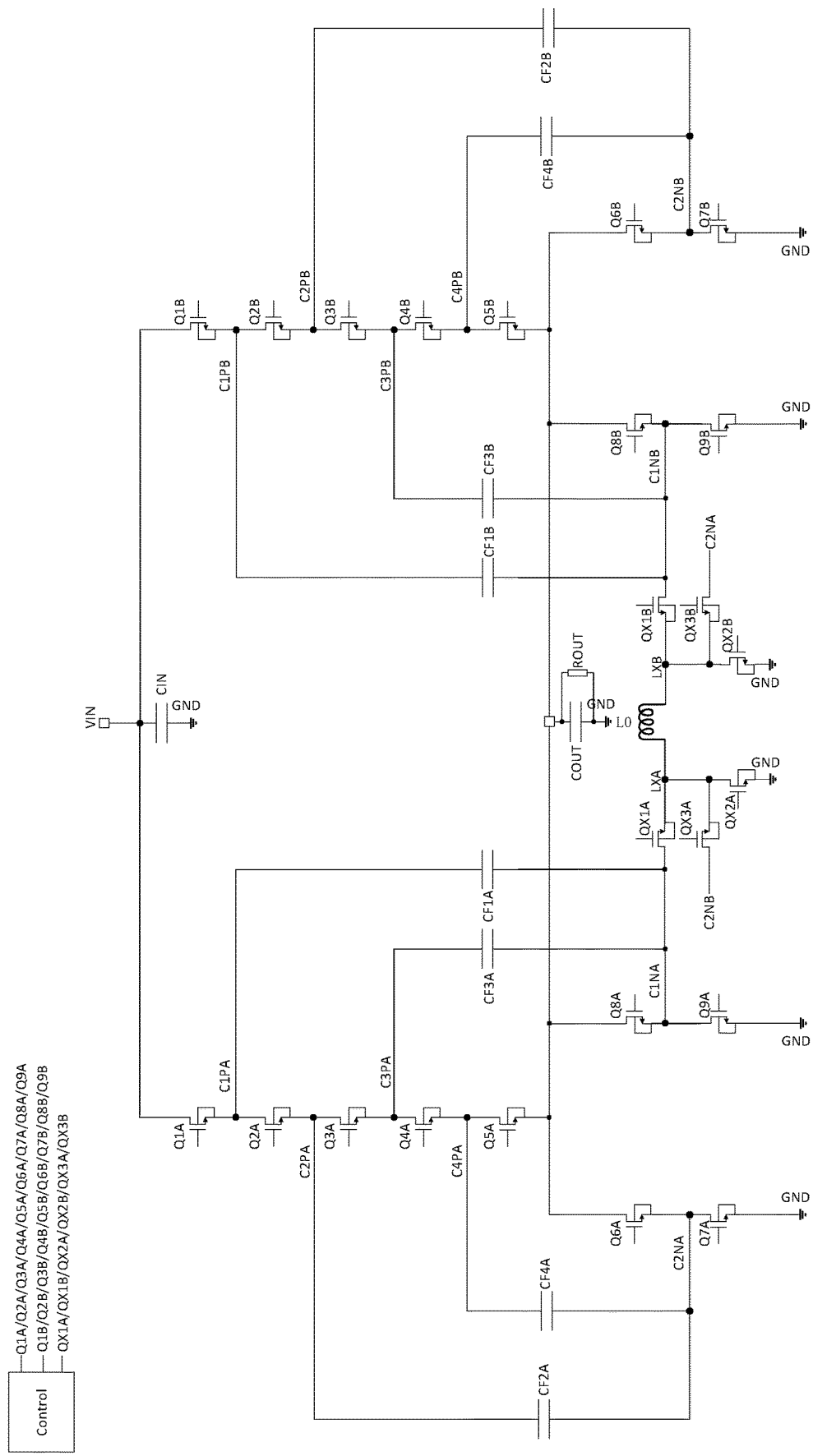
FIG. 13 is a schematic diagram of a circuit structure of a Dickson 5:1 switched capacitor voltage converter of another embodiment of the present application.

The Dickson switched capacitor voltage converter and control method of the embodiments of the present application are applicable not only to the two-branch Dickson 4:1 switched capacitor voltage converter of the above embodiments, but also to other Dickson switched capacitor voltage converters, such as the Dickson 5:1 switched capacitor voltage converter as shown in FIG. 13.

FIG. 13 is a schematic diagram of a circuit structure of a Dickson 5:1 switched capacitor voltage converter of an embodiment of the present application, the Dickson 5:1 switched capacitor voltage converter includes an inductive branch, a first branch and a second branch.

The first branch includes a first switch transistor Q1A, a second switch transistor Q2A, a third switch transistor Q3A, a fourth switch transistor Q4A, a fifth switch transistor Q5A, a sixth switch transistor Q6A, a seventh switch transistor Q7A, an eighth switch transistor Q8A, a first sub-switch transistor Q9A, a first capacitor CF1A, a second capacitor CF2A, a third capacitor CF3A and a first sub-capacitor CF4A; the second branch includes a ninth switch transistor Q1B, a tenth switch transistor Q2B, an eleventh switch transistor Q3B, a twelfth switch transistor Q4B, a thirteenth switch transistor Q5B, a fourteenth switch transistor Q6B, a fifteenth switch transistor Q7B, a sixteenth switch transistor Q8B, a second sub-switch transistor Q9B, a fourth capacitor CF1B, a fifth capacitor CF2B, a sixth capacitor CF3B and a second sub-capacitor CF4B. All switch transistors and sub-switch transistors in the first branch and the second branch are primary switch transistors, each of the primary switch transistors has a parasitic capacitor.

A first terminal of the first switch transistor Q1A and a first terminal of the ninth switch transistor Q1B are connected an input terminal of the Dickson 5:1 switched capacitor voltage converter, and the input terminal is connected to an external input voltage. A second terminal of the first switch transistor Q1A is connected to a first terminal of the second switch transistor Q2A and a first terminal of the first capacitor CF1A, and a second terminal of the ninth switch transistor Q1B is connected to a first terminal of the tenth switch transistor Q2B and a first terminal of the fourth capacitor CF1B. A second terminal of the second switch transistor Q2A is connected to a first terminal of the third switch transistor Q3A and a first terminal of the second capacitor CF2A, and a second terminal of the tenth switch transistor Q2B is connected to a first terminal of the eleventh switch transistor Q3B and a first terminal of the fifth capacitor CF2B. A second terminal of the third switch transistor Q3A is connected to a first terminal of the fourth switch transistor Q4A and a first terminal of the third capacitor CF3A, and a second terminal of the eleventh switch transistor Q3B is connected to a first terminal of the twelfth switch transistor Q4B and a first terminal of the sixth capacitor CF3B.

A second terminal of the fourth switch transistor Q4A is connected to a first terminal of the fifth switch transistor Q5A and a first terminal of the first sub-capacitor CF4A, and a second terminal of the twelfth switch transistor Q4B is connected to a first terminal of the thirteenth switch transistor Q5B and a first terminal of the second sub-capacitor CF4B. A second terminal of the fifth switch transistor Q5A is connected to a first terminal of the sixth switch transistor Q6A and a first terminal of the eighth switch transistor Q8A, a second terminal of the sixth switch transistor Q6A is connected to a second terminal of the first sub-capacitor CF4A, a second terminal of the second capacitor CF2A and a first terminal of the seventh switch transistor Q7A, a second terminal of the eighth switch transistor Q8A is connected to a first terminal of the first sub-switch transistor Q9A, a second terminal of the first capacitor CF1A and a second terminal of the third capacitor CF3A, and a second terminal of the seventh switch transistor Q7A and a second terminal of the first sub-switch transistor Q9A are grounded.

A second terminal of the thirteenth switch transistor Q5B is connected to a first terminal of the fourteenth switch transistor Q6B and a first terminal of the sixteenth switch transistor Q8B, and a second terminal of the fourteenth switch transistor Q6B is connected to a second terminal of the second sub-capacitor CF4B, a second terminal of the fifth capacitor CF2B and a first terminal of the fifteenth switch transistor Q7B. A second terminal of the sixteenth switch transistor Q8B is connected to a first terminal of the second sub-switch transistor Q9B, a second terminal of the fourth capacitor CF1B and a second terminal of the sixth capacitor CF3B. A second terminal of the fifteenth switch transistor Q7B and a second terminal of the second sub-switch transistor Q9B are grounded.

The second terminal of the fifth switch transistor Q5A, the first terminal of the sixth switch transistor Q6A, the first terminal of the eighth switch transistor Q8A, the second terminal of the thirteenth switch transistor Q5B, the first terminal of the fourteenth switch transistor Q6B and the first terminal of the sixteenth switch transistor Q8B are connected to the output terminal of the Dickson 5:1 switched capacitor voltage converter.

The inductive branch includes a seventeenth switch transistor QX1A, an eighteenth switch transistor QX2A, a nineteenth switch transistor QX3A, a twentieth switch transistor QX1B, a twenty-first switch transistor QX2B, a twenty-second switch transistor QX3B and the inductor L0.

The second terminal of the first capacitor CF1A, the second terminal of the third capacitor CF3A, the second terminal of the eighth switch transistor Q8A and the first terminal of the first sub-switch transistor Q9A are connected to a first connection node C1NA; the second terminal of the second capacitor CF2A, the second terminal of the first sub-capacitor CF4A, the second terminal of the sixth switch transistor Q6A and the first terminal of the seventh switch transistor Q7A are connected to a second connection node C2NA; the second terminal of the fourth capacitor CF1B, the second terminal of the sixth capacitor CF3B, the second terminal of the sixteenth switch transistor Q8B and the first terminal of the second sub-switch transistor Q9B are connected to a third connection node C1NB; and the second terminal of the fifth capacitor CF2B, the second terminal of the second sub-capacitor CF4B, the second terminal of the fourteenth switch transistor Q6B and the first terminal of the fifteenth switch transistor Q7B are connected to a fourth connection node C2NB.

The first connection node C1NA is connected to the node LXA via the seventeenth switch transistor QX1A, the fourth connection node C2NB is connected to the node LXA via the nineteenth switch transistor QX3A, the node LXA is connected to the ground via the eighteenth switch transistor QX2A, the third connection node C1NB is connected to the node LXB via the twentieth switch transistor QX1B, the second connection node C2NA is connected to the node LXB via the twenty-second switch transistor QX3B, the node LXB is connected the ground via the twenty-first switch transistor QX2B, and the node LXA and the node LXB are connected via the inductor L0.

In all embodiments of the present application, all switch transistors in the first branch and the second branch are primary switch transistors, each of the primary switch transistors has a parasitic capacitor.

The type and number of switch transistors are not limited to the six N-transistors in the above examples, but may be switch transistors or diodes of other number and other type.

In all embodiments of the present application, all switch transistors and sub-switch transistors in the first branch and the second branch are primary switch transistors, each of the primary switch transistors has a parasitic capacitor.

The control sequence is not limited to the above two control sequences, and other control sequences may be used to control the switch transistors to transfer the electric charges on one branch completely to another branch via the inductor within a short period of time when the primary switch transistors are turned off, so that the effect of zero voltage switching is also achieved, thereby improving the conversion efficiency of the Dickson switched capacitor voltage converter.

Since the specific implementation modes of the circuit structure are various, and the corresponding control methods are also various, they cannot be exemplified one by one in the present application, after those skilled in the art understand the contents of the present application, various modifications, variations or equivalents of the above described examples may be readily conceived, but still be controlled by the limitations set forth in the claims and any equivalents thereof.

What is claimed is:

1. A switched capacitor voltage converter, comprising an inductive branch and two branches, wherein the two branches comprise a first branch and a second branch, and an input voltage, upon travelling via the two branches, is converted into another voltage and output;
   the inductive branch is connected between the first branch and the second branch, and switch transistors in the first branch and the second branch are primary switch transistors; and
   the inductive branch is configured to transfer an electric charge or electric charges on parasitic capacitors of one branch to another branch of the two branches after all the primary switch transistors are turned off, so that a voltage difference between both terminals of each of the primary switch transistors becomes zero, and then the each of the primary switch transistors is turned on, the voltage difference between both terminals of the each of the primary switch transistors is zero at an instant when the each of primary switch transistors is turned on respectively;
   wherein the first branch comprises a first switch transistor, a second switch transistor, a third switch transistor, a fourth switch transistor, a fifth switch transistor, a sixth switch transistor, a seventh switch transistor, an eighth switch transistor, a first capacitor, a second capacitor and a third capacitor; and the second branch comprises a ninth switch transistor, a tenth switch transistor, an eleventh switch transistor, a twelfth switch transistor, a thirteenth switch transistor, a fourteenth switch transistor, a fifteenth switch transistor, a sixteenth switch transistor, a fourth capacitor, a fifth capacitor and a sixth capacitor;
   a first terminal of the first switch transistor and a first terminal of the ninth switch transistor are connected an input terminal of the switched capacitor voltage converter, the input terminal is connected to an external input voltage, a second terminal of the first switch transistor is connected to a first terminal of the second switch transistor and a first terminal of the first capacitor, and a second terminal of the ninth switch transistor is connected to a first terminal of the tenth switch transistor and a first terminal of the fourth capacitor;
   a second terminal of the second switch transistor is connected to a first terminal of the third switch transistor and a first terminal of the second capacitor, and a second terminal of the tenth switch transistor is connected to a first terminal of the eleventh switch transistor and a first terminal of the fifth capacitor;
   a second terminal of the third switch transistor is connected to a first terminal of the fourth switch transistor and a first terminal of the third capacitor, and a second terminal of the eleventh switch transistor is connected to a first terminal of the twelfth switch transistor and a first terminal of the sixth capacitor;
   a second terminal of the fourth switch transistor is connected to a first terminal of the fifth switch transistor and a first terminal of the seventh switch transistor, and a second terminal of the twelfth switch transistor is connected to a first terminal of the thirteenth switch transistor and a first terminal of the fifteenth switch transistor;
   a second terminal of the fifth switch transistor is connected to a second terminal of the first capacitor, a second terminal of the third capacitor and a first terminal of the sixth switch transistor, a second terminal of the seventh switch transistor is connected to a second terminal of the second capacitor and a first terminal of the eighth switch transistor, and a second terminal of the sixth switch transistor and a second terminal of the eighth switch transistor are grounded;
   a second terminal of the thirteenth switch transistor is connected to a second terminal of the fourth capacitor, a second terminal of the sixth capacitor and a first terminal of the fourteenth switch transistor, and a second terminal of the fifteenth switch transistor is connected to a second terminal of the fifth capacitor and a first terminal of the sixteenth switch transistor, and a second terminal of the fourteenth switch transistor and a second terminal of the sixteenth switch transistor are grounded; and
   the second terminal of the fourth switch transistor, the first terminal of the fifth switch transistor, the first terminal of the seventh switch transistor, the second terminal of the twelfth switch transistor, the first terminal of the thirteenth switch transistor and the first terminal of the fifteenth switch transistor are connected to an output terminal of the switched capacitor voltage converter;
   wherein the inductive branch comprises a seventeenth switch transistor, an eighteenth switch transistor, a nineteenth switch transistor, a twentieth switch transistor, a twenty-first switch transistor, a twenty-second switch transistor and the inductor;
   the second terminal of the first capacitor, the second terminal of the third capacitor, the second terminal of the fifth switch transistor and the first terminal of the sixth switch transistor are connected to a first connection point, and the second terminal of the second capacitor, the second terminal of the seventh switch transistor and the first terminal of the eighth switch transistor are connected to a second connection point;
   the second terminal of the fourth capacitor, the second terminal of the sixth capacitor, the second terminal of the thirteenth switch transistor and the first terminal of the fourteenth switch transistor are connected to a third connection point, and the second terminal of the fifth capacitor, the second terminal of the fifteenth switch transistor and the first terminal of the sixteenth switch transistor are connected to a fourth connection point;
   a first terminal of the seventeenth switch transistor is connected to the second connection point, a second terminal of the seventeenth switch transistor is connected to a first terminal of the inductor, a first terminal of the eighteenth switch transistor and a first terminal of the nineteenth switch transistor; a second terminal of the eighteenth switch transistor is grounded, and a second terminal of the nineteenth switch transistor is connected to the third connection point; and
   a second terminal of the inductor is connected to a first terminal of the twentieth switch transistor, a first terminal of the twenty-first switch transistor and a first terminal of the twenty-second switch transistor, and a second terminal of the twentieth switch transistor is connected to the fourth connection point; and a second terminal of the twenty-first switch transistor is grounded, and a second terminal of the twenty-second switch transistor is connected to the first connection point.

2. The switched capacitor voltage converter according to claim 1, wherein a first working cycle of the switched capacitor voltage converter comprises four phases as follows:

a first phase: the first switch transistor, the third switch transistor, the fifth switch transistor, the eighth switch transistor, the tenth switch transistor, the twelfth switch transistor, the fourteenth switch transistor, the fifteenth switch transistor, the seventeenth switch transistor, the nineteenth switch transistor and the twenty-first switch transistor are turned on, and remaining switch transistors are turned off; wherein the input voltage is connected to the output terminal via the first capacitor, the third capacitor is connected in series to the output terminal and then connected in parallel to the second capacitor, the sixth capacitor is connected in parallel to the output terminal, and the fifth capacitor is connected in series to the output terminal and then connected in parallel to the fourth capacitor; and a current on the inductor is zero;

a second phase: the seventeenth switch transistor, the nineteenth switch transistor, the twentieth switch transistor and the twenty-second switch transistor are turned on, and remaining switch transistors are turned off; the current on the inductor increases and then decreases until to zero, and the second phase ends when the current on the inductor decreases to zero;

a third phase: the second switch transistor, the fourth switch transistor, the sixth switch transistor, the seventh switch transistor, the ninth switch transistor, the eleventh switch transistor, the thirteenth switch transistor, the sixteenth switch transistor, the eighteenth switch transistor, the twentieth switch transistor and the twenty-second switch transistor are turned on, and remaining switch transistors are turned off; the third capacitor is connected in parallel to the output terminal, the second capacitor is connected in series to the output terminal and then connected in parallel to the first capacitor, the input voltage is connected to the output terminal via the fourth capacitor, and the sixth capacitor is connected in series to the output terminal and then connected in parallel to the fifth capacitor; and the current on the inductor is zero; and a fourth phase: the seventeenth switch transistor, the nineteenth switch transistor, the twentieth switch transistor and the twenty-second switch transistor are turned on, and remaining switch transistors are turned off; the current on the inductor increases and then decreases until to zero, and the fourth phase ends and the first phase starts when the inductive current decreases to zero.

3. The switched capacitor voltage converter according to claim 1, wherein a second working cycle of the switched capacitor voltage converter comprises four phases as follows:

a first phase: the first switch transistor, the third switch transistor, the fifth switch transistor, the eighth switch transistor, the tenth switch transistor, the twelfth switch transistor, the fourteenth switch transistor, the fifteenth switch transistor, the eighteenth switch transistor and the twenty-first switch transistor are turned on, and remaining switch transistors are turned off; and the input voltage is connected to the output terminal via the first capacitor, the third capacitor is connected in series to the output terminal and then connected in parallel to the second capacitor, the sixth capacitor is connected in parallel to the output terminal, and the fifth capacitor is connected in series to the output terminal and then connected in parallel to the fourth capacitor; and a current on the inductor is zero;

a second phase: the seventeenth switch transistor, the nineteenth switch transistor, the twentieth switch transistor and the twenty-second switch transistor are turned on, and remaining switch transistors are turned off; the current on the inductor increases and then decreases until to zero, and the second phase ends when the current on the inductor decreases to zero;

a third phase: the second switch transistor, the fourth switch transistor, the sixth switch transistor, the seventh switch transistor, the ninth switch transistor, the eleventh switch transistor, the thirteenth switch transistor, the sixteenth switch transistor, the eighteenth switch transistor and the twenty-first switch transistor are turned on, and remaining switch transistors are turned off; and the third capacitor is connected in parallel to the output terminal, the second capacitor is connected in series to the output terminal and then connected in parallel to the first capacitor, the input voltage is connected to the output terminal via the fourth capacitor, and the sixth capacitor is connected in series to the output terminal and then connected in parallel to the fifth capacitor; and the current on the inductor is zero; and a fourth phase: the seventeenth switch transistor, the nineteenth switch transistor, the twentieth switch transistor and the twenty-second switch transistor are turned on, and remaining switch transistors are turned off; the current on the inductor increases and then decreases until to zero, the fourth phase ends and the first phase starts when the current on the inductor decreases to zero.

4. A switched capacitor voltage converter, comprising an inductive branch and two branches, wherein the two branches comprise a first branch and a second branch, and an input voltage, upon travelling via the two branches, is converted into another voltage and output;

the inductive branch is connected between the first branch and the second branch, and switch transistors in the first branch and the second branch are primary switch transistors; and the inductive branch is configured to transfer an electric charge or electric charges on parasitic capacitors of one branch to another branch of the two branches after all the primary switch transistors are turned off, so that a voltage difference between both terminals of each of the primary switch transistors becomes zero, and then the each of the primary switch transistors is turned on, the voltage difference between both terminals of the each of the primary switch transistors is zero at an instant when the each of primary switch transistors is turned on respectively:

wherein the first branch comprises a first switch transistor, a second switch transistor, a third switch transistor, a fourth switch transistor, a fifth switch transistor, a sixth switch transistor, a seventh switch transistor, an eighth switch transistor, a first sub-switch transistor, a first capacitor, a second capacitor, a third capacitor and a first sub-capacitor; and the second branch includes a ninth switch transistor, a tenth switch transistor, an eleventh switch transistor, a twelfth switch transistor, a thirteenth switch transistor, a fourteenth switch transistor, a fifteenth switch transistor, a sixteenth switch transistor, a second sub-switch transistor, a fourth capacitor, a fifth capacitor, a sixth capacitor and a second sub-capacitor;

a first terminal of the first switch transistor and a first terminal of the ninth switch transistor are connected an input terminal of the switched capacitor voltage converter, the input terminal is connected to an external input voltage, a second terminal of the first switch transistor is connected to a first terminal of the second switch transistor and a first terminal of the first capacitor, and a second terminal of the ninth switch transistor is connected to a first terminal of the tenth switch transistor and a first terminal of the fourth capacitor;

a second terminal of the second switch transistor is connected to a first terminal of the third switch transistor and a first terminal of the second capacitor, a second terminal of the tenth switch transistor is connected to a first terminal of the eleventh switch transistor and a first terminal of the fifth capacitor, a second terminal of the third switch transistor is connected to a first terminal of the fourth switch transistor and a first terminal of the third capacitor, and a second terminal of the eleventh switch transistor is connected to a first terminal of the twelfth switch transistor and a first terminal of the sixth capacitor;

a second terminal of the fourth switch transistor is connected to a first terminal of the fifth switch transistor and a first terminal of the first sub-capacitor, a second terminal of the twelfth switch transistor is connected to a first terminal of the thirteenth switch transistor and a first terminal of the second sub-capacitor, a second terminal of the fifth switch transistor is connected to a first terminal of the sixth switch transistor and a first terminal of the eighth switch transistor, a second terminal of the sixth switch transistor is connected to a second terminal of the first sub-capacitor, a second terminal of the second capacitor and a first terminal of the seventh switch transistor, a second terminal of the eighth switch transistor is connected to a first terminal of the first sub-switch transistor, a second terminal of the first capacitor and a second terminal of the third capacitor, and a second terminal of the seventh switch transistor and a second terminal of the first sub-switch transistor are grounded;

a second terminal of the thirteenth switch transistor is connected to a first terminal of the fourteenth switch transistor and a first terminal of the sixteenth switch transistor, a second terminal of the fourteenth switch transistor is connected to a second terminal of the second sub-capacitor, a second terminal of the fifth capacitor and a first terminal of the fifteenth switch transistor, a second terminal of the sixteenth switch transistor is connected to a first terminal of the second sub-switch transistor, a second terminal of the fourth capacitor and a second terminal of the sixth capacitor, and a second terminal of the fifteenth switch transistor and a second terminal of the second sub-switch transistor are grounded; and the second terminal of the fifth switch transistor, the first terminal of the sixth switch transistor, the first terminal of the eighth switch transistor, the second terminal of the thirteenth switch transistor, the first terminal of the fourteenth switch transistor and the first terminal of the sixteenth switch transistor are connected to the output terminal of the switched capacitor voltage converter.

5. The switched capacitor voltage converter according to claim 4, wherein the inductive branch comprises a seventeenth switch transistor, an eighteenth switch transistor, a nineteenth switch transistor, a twentieth switch transistor, a twenty-first switch transistor, a twenty-second switch transistor and the inductor;

the second terminal of the first capacitor, the second terminal of the third capacitor, the second terminal of the eighth switch transistor and the first terminal of the first sub-switch transistor are connected to a first connection node; the second terminal of the second capacitor, the second terminal of the first sub-capacitor, the second terminal of the sixth switch transistor and the first terminal of the seventh switch transistor are connected to a second connection node; the second terminal of the fourth capacitor, the second terminal of the sixth capacitor, the second terminal of the sixteenth switch transistor and the first terminal of the second sub-switch transistor are connected to a third connection node; and the second terminal of the fifth capacitor, the second terminal of the second sub-capacitor, the second terminal of the fourteenth switch transistor and the first terminal of the fifteenth switch transistor are connected to a fourth connection node;

the first connection node is connected to a first terminal of the seventeenth switch transistor, a second terminal of the seventeenth switch transistor is connected to a first terminal of the inductor, a first terminal of the eighteenth switch transistor and a first terminal of the nineteenth switch transistor, a second terminal of the eighteenth switch transistor is grounded, and a second terminal of the nineteenth switch transistor is connected to the fourth connection node; and a second terminal of the inductor is connected to a first terminal of the twentieth switch transistor, a first terminal of the twenty-first switch transistor and a first terminal of the twenty-second switch transistor, a second terminal of the twentieth switch transistor is connected to the third connection node, a second terminal of the twenty-first switch transistor is grounded, and a second terminal of the twenty-second switch transistor is connected to the second connection node.

* * * * *